US012801337B2

(12) United States Patent
Barros et al.

(10) Patent No.: US 12,801,337 B2
(45) Date of Patent: Nov. 17, 2026

(54) SYSTEMS AND METHODS FOR WIRELESSLY PROVIDING AN AUDIO STREAM

(71) Applicant: Google LLC, Mountain View, CA (US)

(72) Inventors: Daniel Barros, Sra da Hora (PT); Sunil Kumar, Cupertino, CA (US); Li-Xuan Chuo, San Jose, CA (US); Qi Jiang, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 342 days.

(21) Appl. No.: 18/495,077

(22) Filed: Oct. 26, 2023

(65) Prior Publication Data

US 2024/0143272 A1 May 2, 2024

Related U.S. Application Data

(60) Provisional application No. 63/440,047, filed on Jan. 19, 2023, provisional application No. 63/419,880, filed on Oct. 27, 2022.

(51) Int. Cl.
*G06F 3/16* (2006.01)
*H04M 1/72412* (2021.01)

(52) U.S. Cl.
CPC ......... *G06F 3/165* (2013.01); *H04M 1/72412* (2021.01)

(58) Field of Classification Search
CPC ...... H04L 1/0002; H04L 1/1874; H04W 4/80; G06F 3/165; H04N 21/43637; H04N 21/4392; H04N 21/6583
See application file for complete search history.

(56) References Cited

U.S. PATENT DOCUMENTS

| | | | | |
|---|---|---|---|---|
| 10,375,652 | B2 * | 8/2019 | Shakya | H04W 52/367 |
| 11,445,286 | B1 * | 9/2022 | Rohit Kumar | H04W 4/80 |
| 2018/0084456 | A1 | 3/2018 | Gostev et al. | |
| 2020/0053460 | A1 * | 2/2020 | Pedersen | G06F 12/0815 |

(Continued)

FOREIGN PATENT DOCUMENTS

| | | |
|---|---|---|
| CN | 112492449 | 3/2021 |
| WO | 2020124610 | 6/2020 |

(Continued)

OTHER PUBLICATIONS

Zeng et al, CN106792462 B, May 22, 2020, see abstract (Year: 2020).*

(Continued)

*Primary Examiner* — Curtis A Kuntz
(74) *Attorney, Agent, or Firm* — DORITY & MANNING P.A.

(57) ABSTRACT

Features described herein pertain to systems and methods for wirelessly providing an audio stream. When audio that is to be output to an audio output device is associated with an application a set of parameters for modifying an established Connected Isochronous Stream (CIS) of a wireless link between an audio source and the audio output device can be determined and the CIS of the wireless link can be modified based on the set of parameters. The audio that is associated with the application can be output to the audio output device using the modified CIS of the wireless link.

20 Claims, 13 Drawing Sheets

(56) References Cited

U.S. PATENT DOCUMENTS

| | | | | |
|---|---|---|---|---|
| 2020/0053611 | A1* | 2/2020 | Jorgovanovic | H04W 36/0027 |
| 2021/0288764 | A1 | 9/2021 | Linsky et al. | |
| 2021/0376884 | A1 | 12/2021 | Linsky et al. | |
| 2022/0014302 | A1* | 1/2022 | Hurwitz | H04W 4/80 |
| 2022/0078541 | A1 | 3/2022 | Zhu et al. | |
| 2022/0124471 | A1 | 4/2022 | Chen | |
| 2022/0239413 | A1 | 7/2022 | Hsieh | |
| 2022/0248333 | A1* | 8/2022 | Soulier | H04W 4/80 |
| 2022/0312167 | A1* | 9/2022 | Gong | H04L 1/1864 |

FOREIGN PATENT DOCUMENTS

| | | |
|---|---|---|
| WO | 2020133183 | 7/2020 |
| WO | WO 2021/205235 | 10/2021 |

OTHER PUBLICATIONS

Soulier et al, WO2020239985 A1, Dec. 3, 2020, see entire document (Year: 2020).*

WO2021087522 A1, Shriner et al, May 6, 2021, see abstract (Year: 2021).*

PCT/US2023/077920 , "International Search Report and the Written Opinion", Jan. 30, 2024, 12 pages.

Bluetooth.com, "Bluetooth Core Specification Version 5.2 Feature Overview", Jan. 6, 2020, https://www.bluetooth.com/bluetooth-resources/bluetooth-core-5-2-feature-overview/, Revision Dec. 9, 2020, 37 pages.

Woolley, "The Bluetooth Low Energy Primer", Bluetooth Blog, Version 1.0.4, Jun. 6, 2022, 87 pages.

* cited by examiner

SYSTEMS AND METHODS FOR WIRELESSLY PROVIDING AN AUDIO STREAM

CROSS-REFERENCES TO RELATED APPLICATIONS

This application claims the benefit of and priority to U.S. Provisional Application No. 63/440,047, filed on Jan. 19, 2023, and U.S. Provisional Application No. 63/419,880, filed on Oct. 27, 2022, the contents of which are herein incorporated by reference in their entireties for all purposes.

BACKGROUND

Short-range wireless technologies such as Bluetooth have enabled extended and remote functionality between devices. As such, users have come to rely on these technologies and expect seamless, glitch-free, and otherwise high-quality experiences while using their Bluetooth-enabled devices. These technologies continue to grow in popularity and, as more devices and use cases incorporate and rely on these technologies, bandwidth management among devices and use cases is challenging.

SUMMARY

Embodiments described herein pertain to systems and methods for wirelessly providing an audio stream.

In various embodiments, a method for wirelessly providing an audio stream includes outputting audio associated with a first application of a plurality of applications to an audio output device using a Connected Isochronous Stream (CIS) of a wireless link between an audio source and the audio output device; determining that a number of audio packets stored in a buffer of the audio source is greater than a predetermined threshold for the buffer of the audio source; modifying the wireless link between the audio source and the audio output device; determining that an acknowledgement packet has been received from the audio output device; and in response to determining that the acknowledgement packet has been received from the audio output device, flushing audio packets stored in the buffer of the audio source.

In various embodiments, the method further includes determining that a link condition score for the wireless link between the audio source and the audio output device is below a predetermined threshold for the wireless link; and in response to determining that the link condition score for the wireless link between the audio source and the audio output device is below the predetermined threshold for the wireless link, modifying the wireless link between the audio source and the audio output device.

In various embodiments, modifying the wireless link between the audio source and the audio output device comprises modifying an FT value for the CIS of the wireless link.

In various embodiments, modifying the wireless link between the audio source and the audio output device comprises increasing transmission power of a wireless communication interface of the audio source.

In various embodiments, modifying the wireless link between the audio source and the audio output device comprises transmitting signals using a beamforming technique.

In various embodiments, the audio output device is a set of true wireless earbuds.

In various embodiments, the method further includes determining that audio that is to be output to the audio output device is associated with a second application of a plurality of applications; in response to determining that the audio that is to be output to the audio output device is associated with the second application, modifying the CIS of the wireless link based on a buffer size of the audio output device to form a modified CIS of the wireless link; and outputting audio associated with the second application to the audio output device using the modified CIS of the wireless link.

Some embodiments include a system for wirelessly providing an audio stream, the system including an audio output device and an audio source, wherein the system is configured to perform part or all of the operations and/or methods disclosed herein.

Some embodiments include one or more non-transitory computer-readable media storing instructions which, when executed by at least one processing system, cause a system to perform part or all of the operations and/or methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
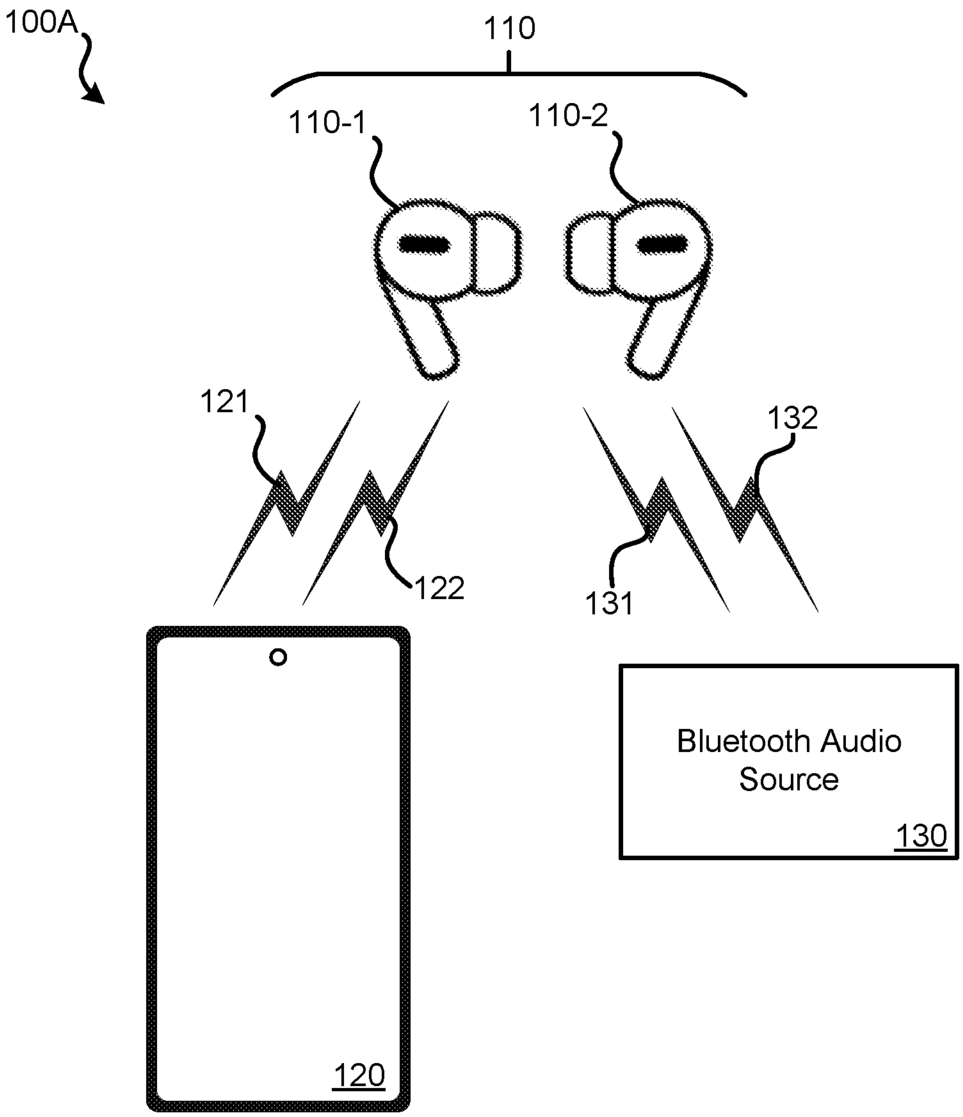
FIG. 1A illustrates an embodiment of an audio system.

Wireless audio playback devices such as true wireless earbuds offer a convenient way for users of electronic devices to listen to audio output by the electronic devices. For example, a user can use an electronic device (e.g., a mobile phone, a personal computer, and the like) to play a video game, watch a movie, listen to music, participate in a voice call, and the like, and use true wireless earbuds to listen to audio output by the electronic device while playing the video game, watching the movie, listening to music, participating in the voice call, and so on. In a typical scenario, a first audio stream is transmitted from the electronic device to one of the earbuds of the true wireless earbuds and a second audio stream is transmitted from the electronic device to the other earbud of the true wireless earbuds. True wireless earbuds often communicate with the electronic device using a short-range wireless technology that utilizes a Bluetooth-family communication protocol, such as Bluetooth Low Energy (LE) Audio or Bluetooth Basic Rate/Enhanced Data Rate (BR/EDR, typically referred to as Bluetooth Classic).

To enable such functionality, the electronic device connects to each earbud and establishes a Connected Isochronous Stream (CIS) or a Broadcast Isochronous Stream (BIS) between the electronic device and the respective earbud. Using the respective CIS or BIS, the electronic device transmits audio packets to each earbud. In the case a CIS utilized, the respective earbuds can return acknowledgments in response to receiving audio packets from the electronic device. To ensure an audio packet is received by each earbud, the electronic device can configure the CIS for the respective earbud such that the audio packet can be retransmitted to the respective earbud in the event the respective earbud does not acknowledge reception of the audio packet.

Audio packets can be transmitted from the electronic device to the respective earbuds in periodic Isochronous Intervals (herein referred to as ISO_Intervals). Each respective ISO_Interval can include a number of sub events (herein referred to as Subevents) reserved for transmitting and retransmitting an audio packet or audio packets. Collectively, the Subevents of a respective ISO_Interval can form a CIS Event for the ISO_Interval. Each Subevent of a CIS Event of a respective ISO_Interval can be used for transmission and/or retransmission of an audio packet. For example, for a CIS Event of an ISO_Interval that is divided into three Subevents, a first Subevent can be used for transmission of an initial audio packet and the second and third Subevents can be used for transmission of another initial audio packet and/or retransmission of the initial audio packet in the event the respective earbud does not acknowledge reception of the initial audio packet. In this way, audio packets stored in a buffer of an electronic device that are available for transmission can be transmitted and/or retransmitted in the Subevents of the CIS Events.

As discussed above, audio packets can be retransmitted in the event transmission of the first audio packet is not successful (i.e., not properly received by the audio output device or acknowledged as being properly received by the audio output device). To configure a CIS for a respective earbud, the electronic device can determine a set of parameters for configuring the CIS such as the number of Subevents per ISO_Interval, how many consecutive ISO_Intervals can be used to transmit the audio packet before it is discarded, and the number of different audio packets for transmission in each CIS Event. The electronic device sets the parameters for configuring the CIS when the CIS is established and generally cannot modify the configuration of the CIS without first tearing down the established CIS and re-establishing a new CIS with different parameters than the previous CIS.

However, tearing down and re-establishing a CIS while a user is listening to audio output by the electronic device can introduce a latency which can cause the user to have an undesirable listening experience. To minimize the potential for latency, the electronic device can be configured to set the parameters for the CIS that would be generally satisfactory for all potential audio output applications. For example, the electronic device can determine a set of CIS parameters that would be generally suitable for audio output by the electronic device for multiple potential audio output applications. However, in this scenario, by generalizing the set of CIS parameters across potential audio output applications, the set of CIS parameters may not be optimized for each potential audio output application. As such, a user may sacrifice a consistent listening experience across all potential audio output applications. Additionally, or alternatively, the electronic device can be configured to establish a CIS for each potential application with parameters for each respective CIS set to optimize the user's listening experience for the application of the respective CIS. For example, the electronic device can establish a CIS for a gaming application with a first set of CIS parameters and, concurrently, establish a CIS for a music playback application with a second set of CIS parameters. However, this scenario often leads to increased power consumption and reduced wireless bandwidth.

The techniques described herein overcome these challenges and/or others by providing a communication technique for changing parameters of an established audio stream without tearing down the audio stream and reestablishing a new audio stream. By dynamically modifying CIS parameters of an established CIS, robustness and latency of an audio stream can be optimized for each desired audio output application without introducing additional latency, increasing power consumption, and reducing available wireless bandwidth. As such, with the features described herein, a user can be provided with a consistent listening experience even when listening to audio output associated with a first application and a second application.

In some implementations, the communication technique includes determining that audio that is to be output to an audio output device, such as a set of true wireless earbuds, is associated with a first application of a plurality of applications and, in response to determining that the audio that is to be output to the audio output device is associated with the first application, determining a set of parameters for modifying a CIS of a wireless link between an audio source and the audio output device. Prior to determining the set of parameters for modifying the CIS of the wireless link between the audio source and the audio output device, a determination can be made that an amount of data stored in a buffer of the audio source is greater than a first predetermined threshold and that an amount of data stored in a buffer of the audio output device is less than a second predetermined threshold. In response to determining that the amount of data stored in the buffer of the audio source is greater than the first predetermined threshold and determining that the amount of data stored in the buffer of the audio output device is less than the second predetermined threshold, the set of parameters for modifying the CIS of the wireless link between the audio source and the audio output device can be determined.

The CIS of the wireless link can be modified based on the set of parameters to form a modified CIS of the wireless link and audio associated with the first application can be output to the audio output device using the modified CIS of the wireless link. Prior to determining that the audio that is to be output to the audio output device is associated with the first application, the wireless link including the CIS between the audio source and the audio output device can be established and audio associated with a second application of the plurality of applications can be output to the audio output device using the CIS of the wireless link. The set of parameters for modifying the CIS of the wireless link can be based on a determined link condition score of the wireless link between the audio source and the audio output device. The set of parameters for modifying the CIS of the wireless link can include at least one of a Number of Subevents (NSE) value, a Flush Timeout (FT) value, and a Burst Number (BN) value for the CIS of the wireless link. Also, modifying the CIS of the wireless link based on the set of parameters can include modifying a CIS of the wireless link for a first earbud of the set of true wireless earbuds and a CIS of the wireless link for a second earbud of the set of true wireless earbuds. The plurality of applications can include an application that is configured to output synchronized audio and video such as a gaming application and an application that is configured to output audio such as a music playback application.

The audio can be output to the audio output device by storing audio packets in a buffer of the audio source and transmitting stored audio packets to the audio output device using the CIS of the wireless link. A determination can be made that a number of audio packets stored in a buffer of the audio source is greater than a predetermined threshold for the buffer of the audio source. A determination can also be made that a link condition score for the wireless link between the audio source and the audio output device is below a predetermined threshold for the wireless link. In response to determining that the number of audio packets stored in the buffer of the audio source is greater than the predetermined threshold for the buffer of the audio source and/or that the link condition score for the wireless link between the audio source and the audio output is below the predetermined threshold for the wireless link, the wireless link between the audio source and the audio output device can be modified. Modifying the wireless link between the audio source and the audio output device can include modifying a FT value for the CIS, increasing transmission power of a wireless communication interface of the audio source, and/or transmitting signals from the audio source using a beamforming technique. A determination can then be made that an acknowledgement packet has been received from the audio output device and, in response to determining that an acknowledgement has been received from the audio output device, the audio packets stored in the buffer of the audio source can be flushed.

"True wireless earbuds," as used herein, refer to earbuds that both: 1) receive audio packets wirelessly from one or more audio sources; and 2) are not physically connected with each other, such as via a wire. Therefore, in a pair of true wireless earbuds, each earbud must have its own power supply and wireless communication interface to allow for communication. As described herein, embodiments of earbuds, unless otherwise noted, are directed to true wireless earbuds.

Figure 1B:
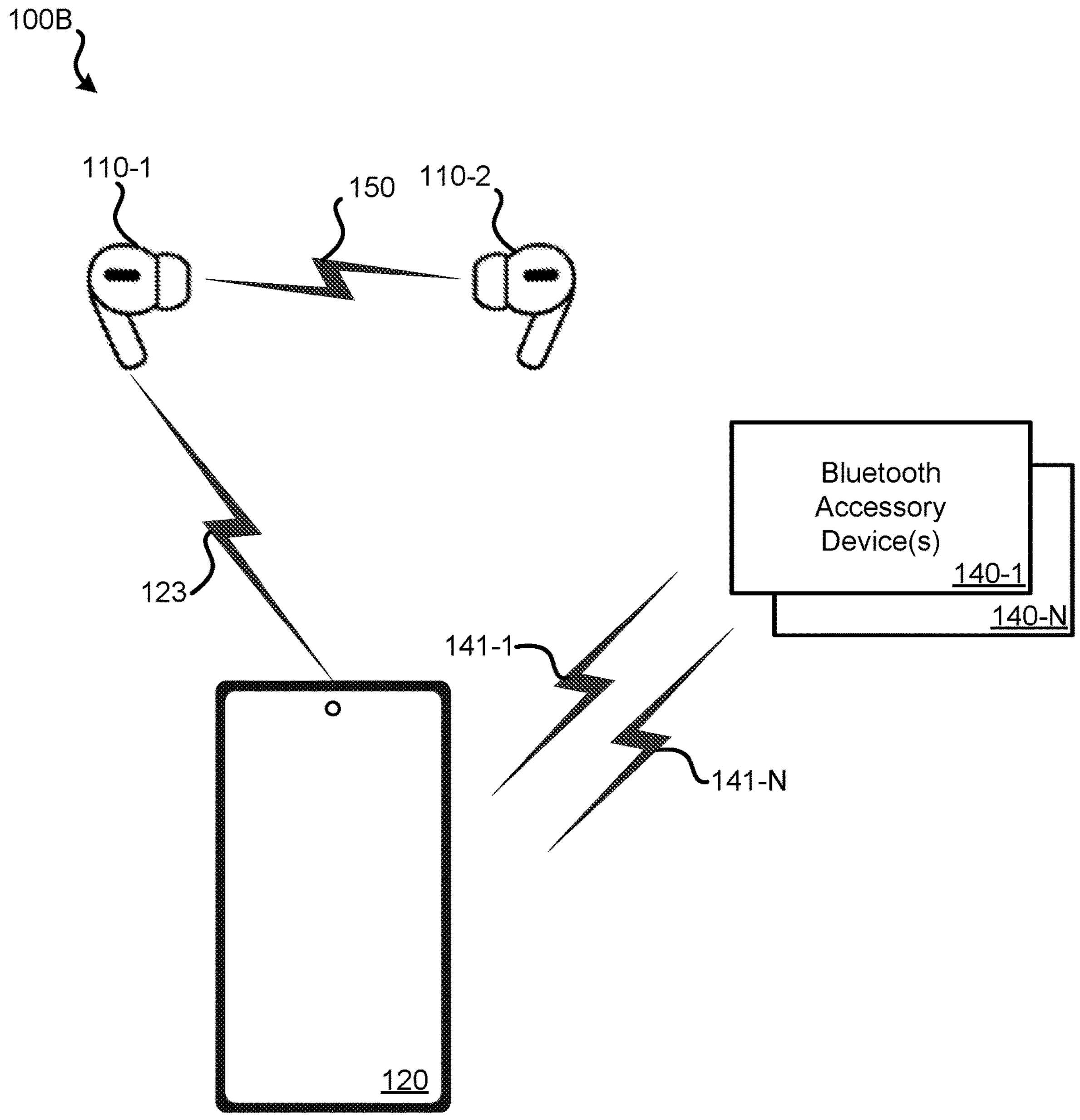
FIG. 1B illustrates another embodiment of an audio system.

FIGS. 1A and 1B illustrate embodiments of an audio system. As shown in FIG. 1A, audio system 100A can include earbuds 110 (which can include earbud 110-1 and earbud 110-2), audio source 120, and audio source 130, and, as shown in FIG. 1B, audio system 100B can include earbuds 110, audio source 120, and accessory devices 140 (which can include multiple accessory devices 140-1, . . . 140-N). Although not shown, audio system 100A can also include accessory devices such as accessory devices 140. Similarly, audio system 100B can also include additional audio sources such as audio source 130.

Audio source 120 can represent various forms of computerized devices capable of Bluetooth communications. As illustrated, one possible form of audio source 120 is a smartphone. For example, a smartphone can output stereo audio (e.g., music, gaming audio, audio for an audio or video conference) and mono audio (e.g., audio for a telephone call, mono audio for an audio or video conference). Many other forms of audio source 120 may be possible, such as: a tablet computer, a gaming device, a laptop computer, a desktop computer, a stereo system, and a television. More generally, any computerized device that outputs Bluetooth audio can serve as audio source 120. In some embodiments, audio source 120, when used for voice phone calls, can alternatively be used as and referred to as a call gateway. (In voice call terminology, earbuds 110 can be referred to as a "call terminal.")

In general, Bluetooth-family protocols are used as the short-range wireless technology standards for exchanging data between audio source 120 (and possibly audio source 130) and earbuds 110 and between audio source 120 and accessory devices 140. Within the Bluetooth-family, various versions of Bluetooth may be used, depending on the particular embodiment. The embodiments detailed herein rely on Bluetooth LE Audio as the specific Bluetooth-family protocol for communication. However, other Bluetooth-family protocols such as Bluetooth Classic can be used for communication. The same hardware may be used to implement any of these Bluetooth-family protocols.

Depending on the version of Bluetooth that is used, one or more Bluetooth profiles may be used to define a connection/communication protocol between a central (or first) device and peripheral (or second) device(s) and between peripheral devices. For example, the connection/communication protocol between the audio source 120 and earbuds 110 may be defined by the Advanced Audio Distribution Profile (A2DP) and/or the Hands-Free Profile (HFP). Similarly, the connection/communication protocol between the audio source 120 and the accessory devices 140 may be defined by the Human Interface Device (HID) Profile. The foregoing profiles are not intended to be limiting and the various embodiments described herein can use other Bluetooth profiles such as the Headset Profile (HSP) and the Mesh Profile (MESH).

Further, embodiments detailed herein may use one or more of these Bluetooth-family protocols as a starting point but may have additional features that go beyond the specification of the standard. These additional features require both an audio source and earbuds that are compatible with the additional features to be used in order for the additional features to be available. As an example, one manufacturer may produce earbuds and audio sources (e.g., smartphones, laptop computers, tablet computers) that support additional features that go beyond the minimum features of a Bluetooth-family protocol when used together. However, when one of such devices is used with another manufacturer's devices, such additional features beyond the Bluetooth-family may not be available unless the manufacturers have cooperated on implementing the additional features.

While the embodiments detailed herein are focused on improvements to Bluetooth-family protocols, it should be understood that the embodiments detailed herein can also be applied to other short-range wireless technologies that could be used to enable communication between devices. For example, the embodiments detailed herein are equally applicable to the following technologies: infrared data association (IrDA); radio frequency identification (RFID); wireless local access network (WLAN); near field communication (NFC); ZigBee; Z-wave; wireless fidelity (Wi-Fi) and wireless fidelity direct (Wi-Fi Direct); ultra-wideband (UWB); ANT and ANT+; third generation (3G), fourth generation (4G), fifth generation (5G), and sixth generation (6G), and the like.

As illustrated in FIG. 1A, separate data streams may be used between an audio source and each earbud of earbuds 110. In a Bluetooth LE Audio scenario, as discussed above, a CIS or BIS may be present on link 121 from audio source 120 to earbud 110-1. A separate CIS or BIS may be present as part of link 122 to earbud 110-2. If audio is being transmitted from an earbud of earbuds 110 to audio source 120 (e.g., from a microphone of an earbud for a phone call), another CIS or BIS may be present from an earbud to audio source 120. Alternatively, the same CIS or BIS can be used for transmitting microphone audio from an earbud to audio source 120. Separate CISs or BISs may also exist as part of wireless communications 131 and wireless communications 132 between an additional audio source such as audio source 130 and earbuds 110. Separately, between each audio source and each earbud, can be another channel, referred to as an asynchronous connection-oriented link (ACL) that allows for control data to be transmitted between the audio source and the particular earbud in both directions.

While one or more active communication channels are present between audio source 120 and earbuds 110, one or more separate active communication channels can be present between earbuds 110 and audio source 130. Again here many other audio sources may be possible, such as: a tablet computer, a gaming device, a laptop computer, a desktop computer, a computerized music device, a stereo system, a television, or any computerized device that can output Bluetooth audio can serve as audio source 130.

Various use cases exist where it can be beneficial to a user for earbuds 110 to have communication channels with multiple audio sources. For example, earbuds 110 may receive audio from a computer (e.g., as audio source 120) for a video conference, but the user may desire to allow his smartphone (e.g., as audio source 130) to output notifications that are played instead of or over the audio for the video conference. As another example, a user may be listening to music via their smartphone (e.g., as audio source 120), while listening to the music, the user may be in a public place that outputs auditory notifications via Bluetooth, such as flight notifications at an airport. A computerized system of the airport may function as audio source 130 which causes flight notifications to be output instead of or over the audio being streamed to earbuds 110 by audio source 120.

Notably, audio source 130 may not be present in many embodiments or may only be intermittently present. Referring to the previous example, after leaving the airport (or perhaps disabling notifications), earbuds 110 may only receive audio from audio source 120. Other similar examples exist. For example, referring to the first example, after conclusion of the video conference, earbuds 110 may only receive audio (e.g., the auditory notifications) from their smartphone. While the example of FIG. 1 illustrates two audio sources, it may be possible for earbuds 110 to receive audio from more than two audio sources. Earbuds 110 may be configured to prioritize and/or mix audio received concurrently from different audio sources.

For mono audio (e.g., a phone call, videoconference), the audio transmitted to one or each earbud of earbuds 110 from an audio source, such as audio source 120, may be the same. For stereo audio (e.g., music playback, gaming), the audio transmitted to one or each earbud of earbuds 110 differs.

Turning to FIG. 1B, data may be transmitted between an audio source 120 and a primary earbud such as earbud 110-1 of earbuds 110 and data may be transmitted between the primary earbud 110-1 and a secondary earbud such as earbud 110-2. In a Bluetooth Classic scenario, data may be transmitted using a synchronous connection-oriented (SCO) channel or extended synchronous connection-oriented (eSCO) channel that may be present on link 123 between audio source 120 and primary earbud 110-1 and data may be transmitted using an ACL that may be present on link 150 between primary earbud 110-1 and secondary earbud 110-2. In some embodiments, the data on link 123 and/or link 150 can include audio or voice data and control data transmitted in both directions. Control data as used herein generally refers to information pertaining to the link between the audio source 120 and primary earbud 110-1 and link between primary earbud 110-1 and the secondary earbud 110-2 (e.g., physical layer properties, timing information, encryption keys, power requirements, and the like). If audio is being transmitted from an earbud of earbuds 110 to audio source 120 (e.g., from a microphone of an earbud for a phone call), the SCO or eSCO link may be used and/or another SCO or eSCO link (not shown) may be used. Separate links may also respectively exist as part of wireless communications 141-1 through wireless communications 141-N between audio source 120 and accessory devices 140-1 through 140-N. In some embodiments, these links may be a link defined by the HID Profile under the Bluetooth core specification.

While one or more active communication channels are present between audio source 120 and earbuds 110, one or more separate active communication channels can be present between audio source 120 and accessory devices 140. Accessory device 140 can represent various forms of computerized devices capable of communicating and exchanging data using Bluetooth connections. One example of an accessory device included in accessory devices 140 is a wireless keyboard and another example of an accessory device included in accessory devices 140 is a wireless mouse. Other examples of accessory devices include human interface devices, printers, scanners, network devices, gaming devices, display assistants, and the like. In general, any computerized device that can communicate using Bluetooth can serve as an accessory device included in accessory devices 140. In some embodiments, an accessory device included in accessory devices 140 can be used as and referred to as a peripheral and/or human interface device.

In some embodiments, communication between earbuds 110 and audio source 120 can be an acknowledgement, referred to as an ACK for short. An ACK can allow one of or both earbuds 110 to notify the audio source 120 that a Bluetooth packet was properly received from the audio source 120. Similarly, an ACK can allow the audio source 120 to notify one of or both earbuds 110 that a Bluetooth packet was properly received from one of or both earbuds. An ACK and data packets between earbuds can be sent using the same radio used for Bluetooth communications. At a high level, when a packet addressed to a first earbud such as earbud 110-1 is properly received by the first earbud 110-1, the first earbud 110-1 can transmit an ACK to the audio source 120. This arrangement can prevent the audio source 120 from retransmitting the packet to the earbud 110-1 and/or can allow the earbud 110-1 to transmit the packet to the second earbud 110-2 if the second earbud 110-2 cannot intercept and/or otherwise acquire the packet transmitted from the audio source 120. While an ACK is one form of communication that can occur between audio source 120 and earbuds 110, other communications detailed herein between earbuds may not involve an ACK being transmitted.

Figure 2:
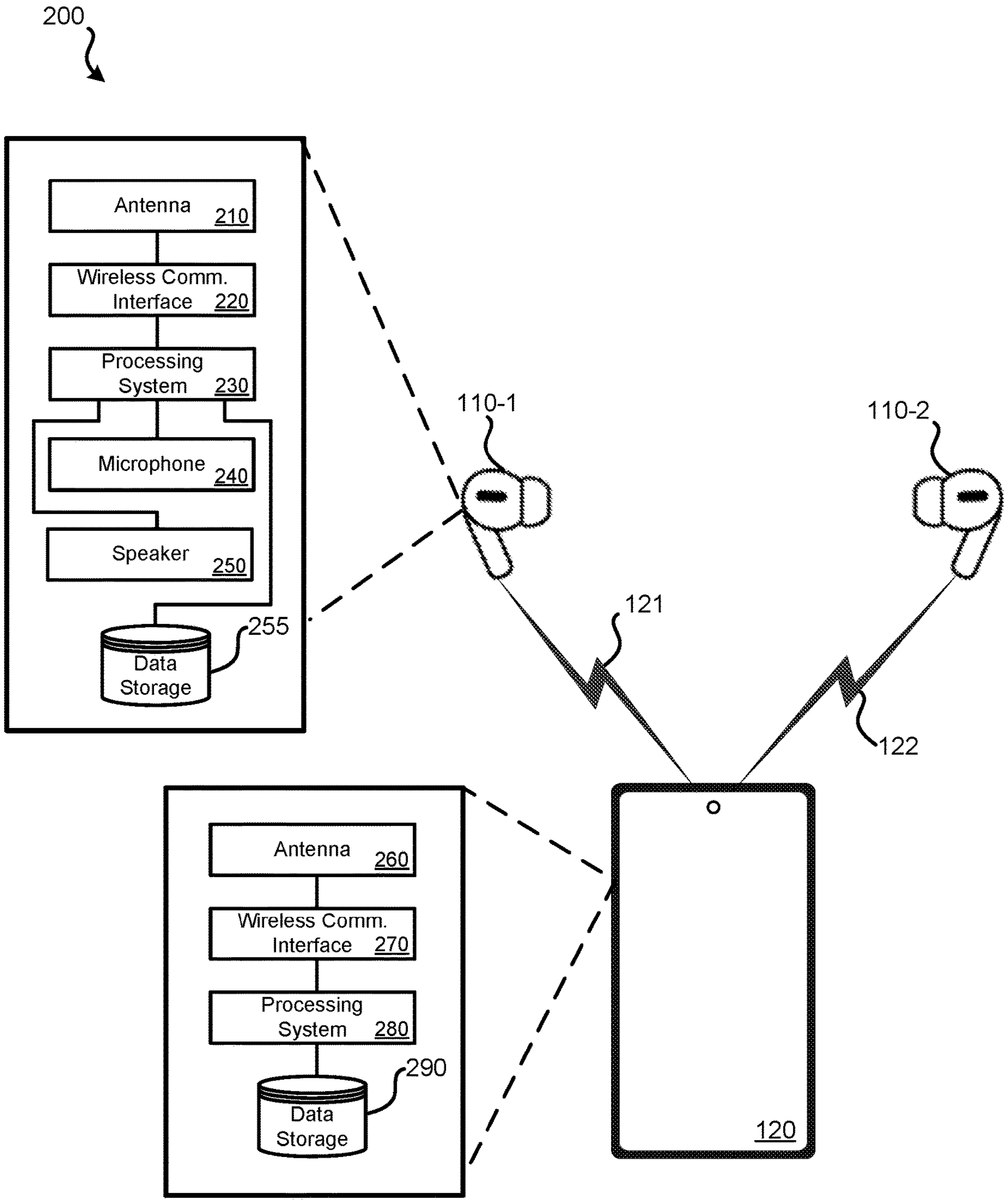
FIG. 2 illustrates an embodiment of a block diagram of an audio system that includes a pair of true wireless earbuds communicating with an audio source.

FIG. 2 illustrates an embodiment of a block diagram of an audio system 200 that includes a pair of true wireless earbuds communicating with an audio source. Audio system 200 can represent an embodiment of audio system 100A in which only a single audio source is present or audio system 100B. Audio system 200 can include earbuds 110 and audio source 120.

Referring to earbuds 110, components of earbud 110-1 can include: antenna 210; wireless communication interface 220; processing system 230; microphone 240; speaker 250; and data storage 255. Earbud 110-2 may have the same components. Antenna 210 can be used for receiving and transmitting Bluetooth-family communications, including LE, LE Audio, and/or BR/EDR. Wireless communication interface 220 can be implemented as a system on a chip (SOC). Wireless communication interface 220 can include a Bluetooth radio and componentry necessary to convert raw incoming data (e.g., audio data, other data) to Bluetooth packets for transmission via antenna 210. Wireless communication interface 220 may also include componentry to enable one or more alternative or additional forms of wireless communication, both with an audio source and between earbuds. Processing system 230 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored locally using one or more non-transitory processor-readable mediums via data storage 255, such as random-access memory (RAM), and/or flash memory. In some embodiments, processing system 230 and wireless communication interface 220 may be part of a same circuit or SOC.

In some earbuds, microphone 240 may be present. In some embodiments, each of earbuds 110 has a microphone. In other embodiments, only one of earbuds 110 has a microphone. In still other embodiments, no microphone may be present in either of earbuds 110. Audio captured using the one or more microphones of earbuds 110 can be transmitted to audio source 120. This audio, which can be referred to as "upstream" audio, may include voice, such as for use in a telephone call, video conference, gaming, etc. Various componentry (not illustrated) may be present between wireless communication interface 220, processing system 230, and microphone 240, such as an analog to digital converter (ADC) and an amplifier.

Speaker 250 converts received analog signals to audio. Various componentry (not illustrated) may be present between wireless communication interface 220, processing system 230, and speaker 250, such as a digital to analog converter (DAC) and an amplifier.

Various components of earbud 110-1 are not illustrated. In addition to the ADC, DAC, and amplifiers previously mentioned, earbud 110-1 also includes a power storage component, such as one or more batteries, and associated componentry to allow for recharging of the power storage component. Also present is a housing and componentry to hold earbud 110-1 within a user's ear. One or more non-transitory processor readable mediums can be understood as present and accessible by wireless communication interface 220, processing system 230, or both. For instance, such mediums may be used for temporary storage of data (e.g., buffers) and storing data necessary for Bluetooth communication (e.g., encryption keys).

Audio source 120 can include: antenna 260; wireless communication interface 270; processing system 280; and data storage 290. Antenna 260 can be used for receiving and transmitting Bluetooth-family communications, including LE, LE Audio, and/or BR/EDR. Wireless communication interface 270 can be implemented as a SOC. Wireless communication interface 270 can include a Bluetooth radio and componentry necessary to convert raw incoming data (e.g., audio data, other data) to Bluetooth packets for transmission via antenna 260. Wireless communication interface 270 can additionally or alternatively be used for one or more other forms of wireless communications. Processing system 280 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored locally using one or more non-transitory processor-readable mediums via data storage 290, which can include RAM, flash memory, a HDD and/or a SSD. In some embodiments, processing system 280 and wireless communication interface 270 may be part of a same circuit or SOC.

Audio source 120 can include various other components. For example, if audio source 120 is a smartphone, various components such as: one or more cameras, a display screen or touch screen, volume control buttons, other wireless communication interfaces can be present. In another example, one or more non-transitory processor readable mediums can be understood as present and accessible by wireless communication interface 270, processing system 280, or both. For instance, such mediums may be used for temporary storage of data (e.g., buffers) and storing data necessary for Bluetooth communication (e.g., encryption keys).

Figure 3:
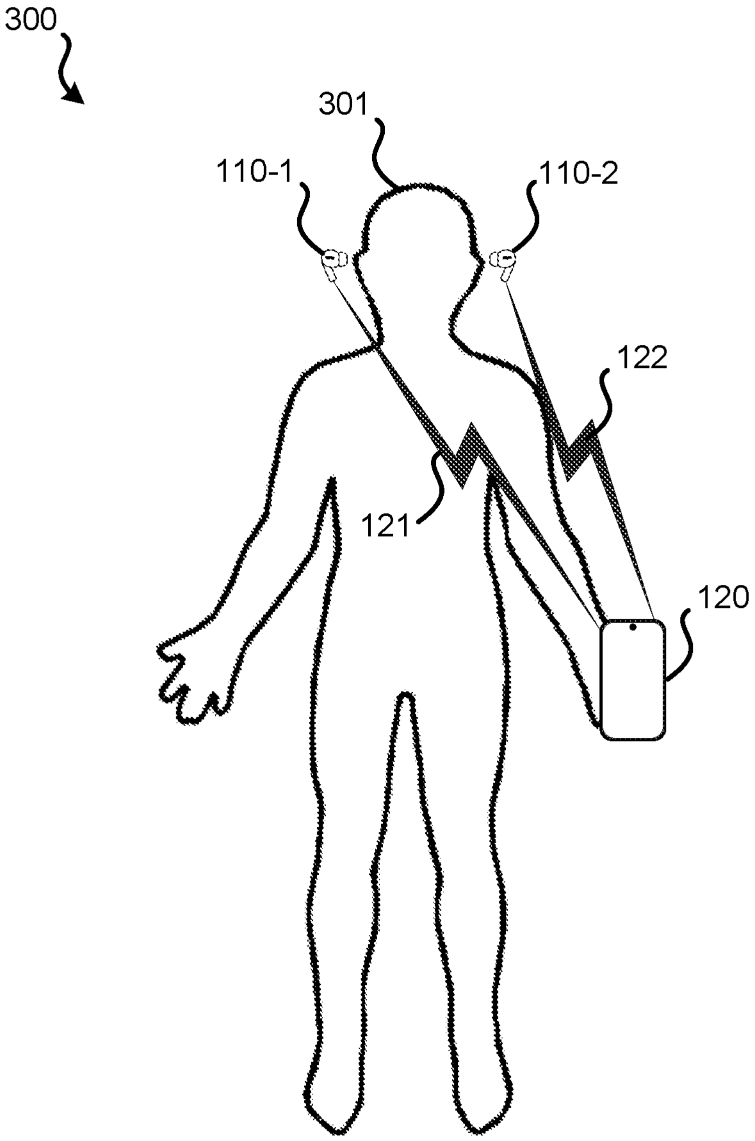
FIG. 3 illustrates an embodiment of cross-body attenuation resulting in communication between an audio source and a first earbud experiencing more attenuation than communication between the audio source and the second earbud.

FIG. 3 illustrates an embodiment 300 of cross-body attenuation resulting in communication between an audio source and a first earbud experiencing more attenuation (or path loss) than communication between the audio source and the second earbud. In embodiment 300, user 301 is holding audio source 120 in their left hand (that is, as illustrated, user 301 is facing out of the page). Bluetooth communications occur between audio source 120 and earbud 110-2 as indicated by link 122; Bluetooth communications between audio source 120 and earbud 110-1 as indicated by link 121.

Due to audio source 120 being in the user's left hand, link 121 with earbud 110-1, which is in the user's right ear, results in wireless signals travelling through more of the user's body than link 122. Therefore, more attenuation occurs in link 121 than link 122. Accordingly, it is more likely that Bluetooth data packets exchanged between earbud 110-1 and audio source 120 may be not properly received than Bluetooth data packets exchanged between earbud 110-2 and audio source 120.

Which earbud experiences more attenuation and/or interference in its communications with an audio source can vary based on the location of audio source 120. Common places where user 301 may keep audio source 120 are: in a left hand; in a right hand; in a front left or right pocket, in a rear left or right pocket; on an arm band; in a left or right chest pocket; and on a surface or dock. Each of these locations can result in significantly different communication paths between each earbud and the antenna of the audio source and, thus, one earbud's communications can experience significantly higher interference or attenuation than the other earbud's communications.

Figure 4:
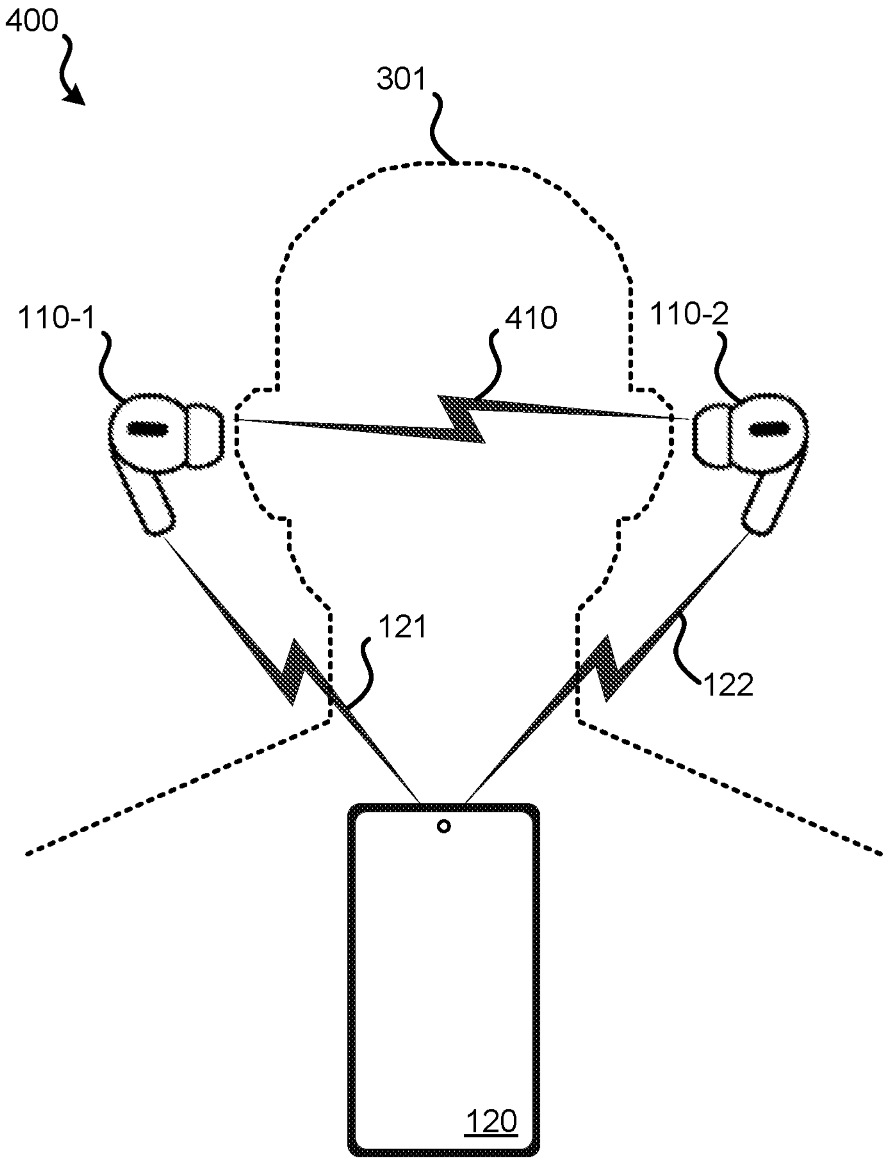
FIG. 4 illustrates an embodiment of an audio system in which true wireless earbuds communicate with each other in addition to communicating with an audio source.

FIG. 4 illustrates an embodiment of an audio system 400 in which true wireless earbuds communicate with each other in addition to communicating with an audio source. Earbud 110-1 can perform wireless communications using cross-link 410 with earbud 110-2 and, similarly, earbud 110-2 can perform wireless communications using cross-link 410 with earbud 110-1 in some embodiments. This communication can occur via a proprietary link specific to earbuds 110 and therefore can be outside of any Bluetooth family protocol specification. The path between earbuds 110, when in use by user 301, is predictable because the distance and the object through which the signals pass (the head of user 301) remains constant. As detailed herein, the ability of earbuds 110 to communicate with each other can have significant advantages.

Cross-link 410 can use LE 2M, LE HDT (pending standardization), LE proprietary high data rate modes, classic BR/EDR, or some proprietary communication scheme. Therefore, while Bluetooth-compliant wireless communications occur between earbuds 110 and audio source 120, communications directly between earbuds do not necessarily need to be compliant with Bluetooth or any other particular communication protocol.

In some embodiments, communication between earbuds 110 can be a cross-acknowledgement, referred to as a CrossACK for short. As detailed herein, "cross-" communications refer to wireless communications transmitted directly from a first earbud and received by a second earbud. A CrossACK can allow one of earbuds 110 to notify the other earbud of earbuds 110 that a Bluetooth packet was properly received from a source device. A CrossACK and data packets between earbuds can be sent using the same radio used for Bluetooth communications. At a high level, when a packet addressed to only a first earbud is not properly received by the first earbud, but is properly received by the second earbud, the second earbud can transmit a CrossACK to the first earbud. The first earbud may then request the packet be relayed to the first earbud from the second earbud. This arrangement prevents the first earbud from having to request retransmission from the source device and/or can allow the first earbud to obtain the data from the second earbud if transmissions from the audio source continue to fail.

While a CrossACK is one form of communication that can occur between earbuds 110, other communications detailed herein between earbuds may not involve a CrossACK being transmitted.

Figure 5:
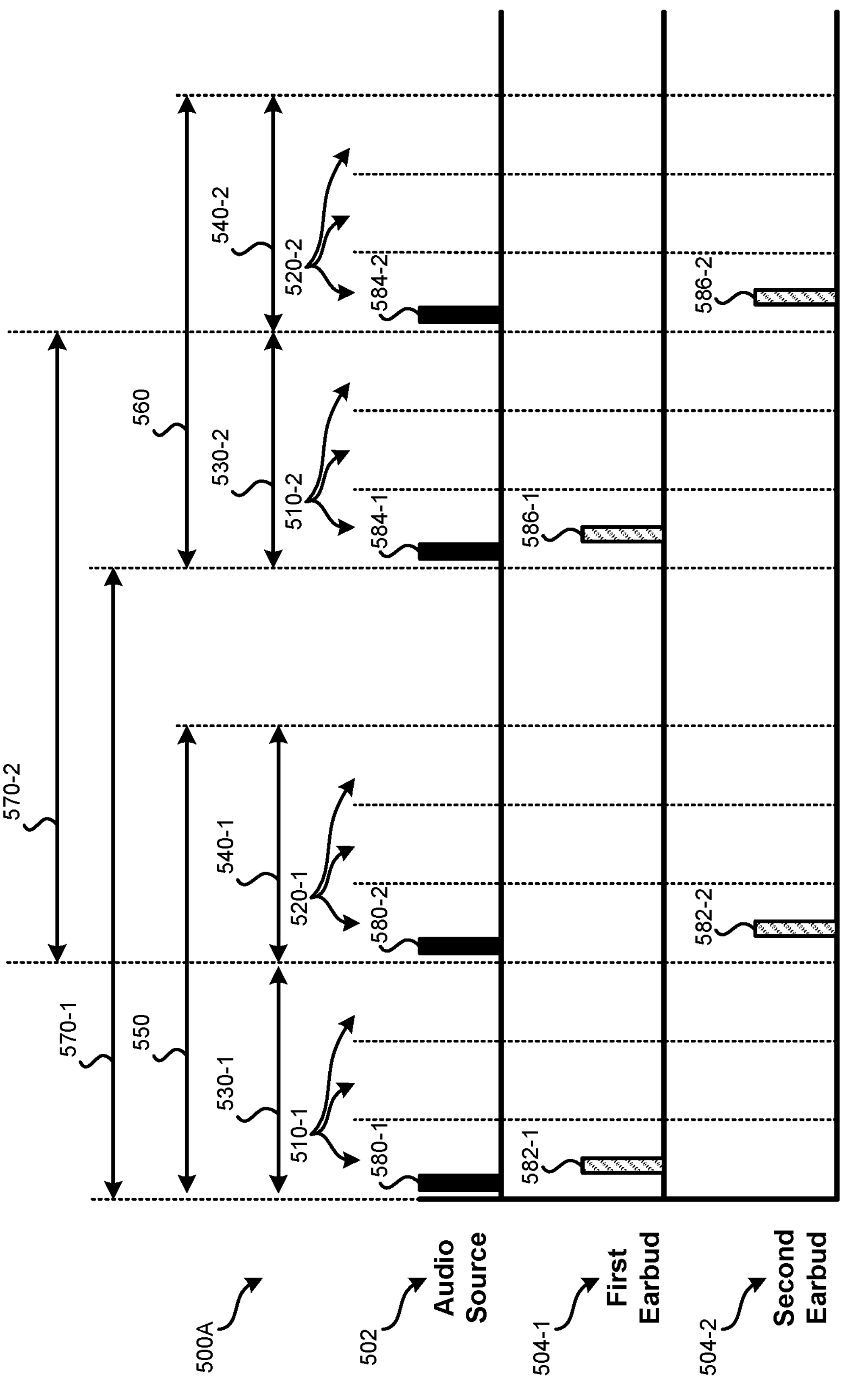
FIG. 5 illustrates an embodiment of a communication technique for outputting audio from an audio source to an audio output device according to various embodiments.

FIG. 5 illustrates an embodiment of a communication technique 500A for outputting audio from an audio source 502 to an audio output device in good wireless link conditions. The audio output device can be a set of true wireless earbuds that includes a first earbud 504-1 and a second earbud 504-2. The audio source 502 can be connected to the first and second earbuds 504-1, 504-2 using a Bluetooth LE Audio connection. Good wireless link conditions, as used herein, refers to conditions of the Bluetooth LE Audio connection which facilitate the first and second earbuds 504-1, 504-2 in properly receiving audio packets transmitted by the audio source 502 while outputting audio using the Bluetooth LE Audio connection. In some implementations, the conditions of the wireless link can be determined by measuring packet error rate (PER), signal-to-noise ratio (SNR), received signal strength indicator (RSSI), and the like.

In some implementations, audio source 502 can output audio and a user such as user 301 can listen to the output audio using first and second earbuds 504-1, 504-2. The audio source 502 can be connected to the first earbud 504-1 using a CIS of the Bluetooth LE Audio connection. Similarly, the audio source 502 can be connected to the second earbud 504-2 using another CIS of the Bluetooth LE Audio connection. The CIS for the first earbud 504-1 (herein referred to as the "first CIS") and the CIS for the second earbud 504-2 (herein referred to as the "second CIS") can form a Connected Isochronous Group (CIG). In some implementations, at the time the Bluetooth LE Audio connection is established, the audio source 502 can set parameters for configuring the first and second CISes. To output audio, the audio source 502 can sample an audio signal at a predetermined rate, encode the audio sample into packets, store the audio packets in a buffer, and transmit or stream the stored audio packets to the audio output device using the first and second CISes. In some implementations, the audio stream to the first earbud 504-1 can be a left channel stream of stereo audio and the audio stream to the second earbud 504-2 can be a right channel stream of the stereo audio.

The stored audio packets can be transmitted to the first and second earbuds 504-1, 504-2 in ISO_Intervals 570-1, 570-2. Each ISO_Interval 570-1, 570-2 can span a period of time and the period of time can be the same among the ISO_Intervals 570-1, 570-2. In some implementations, the period of time can correspond to a frame rate of the audio packets and/or multiples of the frame rate of the audio packets. In some implementations, the audio packets can be transmitted at a frame rate of 10 milliseconds (i.e., each audio sample includes 10 milliseconds of audio). As such, in the case of a frame rate of 10 milliseconds, each ISO_Interval 570-1, 570-2 can be 10 milliseconds or multiples of 10 milliseconds.

Each respective ISO_Interval 570-1, 570-2 can include a number of Subevents 510-1, 510-2, 520-1, 520-2 that can be reserved for transmitting and retransmitting an audio packet or audio packets. Collectively, the Subevents 510-1, 510-2, 520-1, 520-2 of a respective ISO_Interval 570-1, 570-2 can form a CIS Event 530-1, 530-2, 540-1, 540-2 for the ISO_Interval 570-1, 570-2. Each Subevent of a CIS Event of a respective ISO_Interval can be reserved for transmission and/or retransmission of an audio packet 580-1, 580-2, 584-1, 584-2. For example, for a first CIS Event 530-1 of a first ISO_Interval 570-1 that is divided into three Subevents 510-1 (identified by the dotted lines), a first Subevent can be reserved for transmission of the audio packet 580-1 and the second and third Subevents can be reserved for retransmission of the audio packet and/or transmission of another audio packet (not shown). In another example, for a first CIS Event 540-1 of a second ISO_Interval 570-2 that is divided into three Subevents 520-1 (identified by the dotted lines), a first Subevent can be reserved for transmission of the audio packet 580-2 and the second and third Subevents can be reserved for retransmission of the audio packet and/or transmission of another audio packet (not shown). To notify the audio source 502 that an audio packet transmitted to first and second earbuds 504-1, 504-2 was properly received by the first and second earbuds 504-1, 504-2, the first and second earbuds 504-1, 504-2 can send acknowledgement packets 582-1, 582-2, 586-1, 586-2 upon receiving an audio packet 580-1, 580-2, 584-1, and 584-2.

Figure 6:
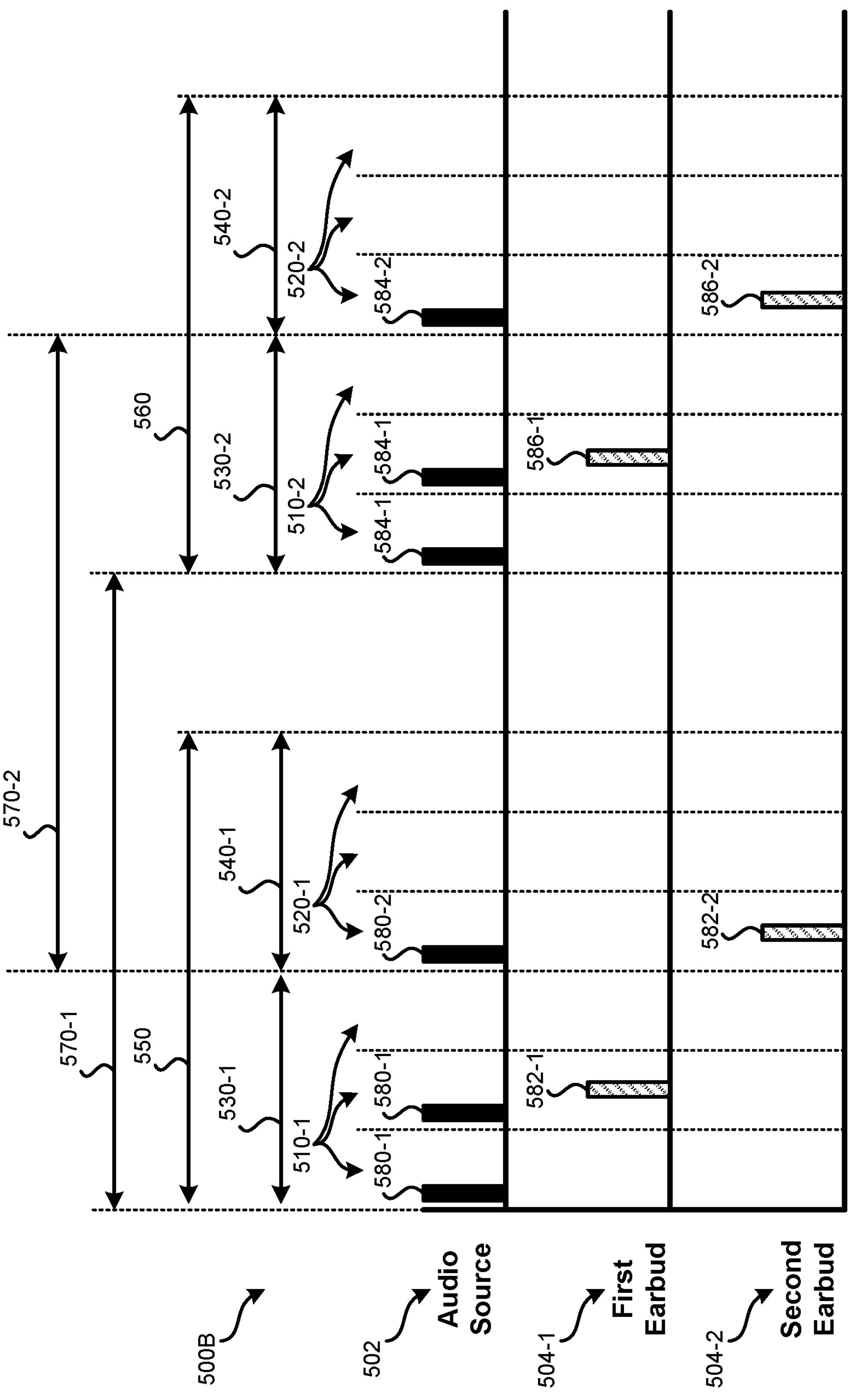
FIG. 6 illustrates another embodiment of a communication technique for outputting audio from an audio source to an audio output device according to various embodiments.

As discussed above, FIG. 5 illustrates an embodiment of a communication technique 500A in good wireless link conditions. However, in the case of poor link conditions, audio packets may not be properly received and/or acknowledged by the audio output device. In the case where an initial or first transmission of a given audio packet in an ISO_Interval is not properly received by the audio output device and/or acknowledged as being properly received by the audio output device in the ISO_Interval, the audio packet can be retransmitted in the same ISO_Interval. FIG. 6 illustrates an embodiment of a communication technique 500B for outputting audio from the audio source 502 to the audio output device in poor wireless link conditions. Poor wireless link conditions, as used herein, refers to conditions of the Bluetooth LE Audio connection in which the first and/or second earbuds 504-1, 504-2 may not properly receive audio packets transmitted by the audio source 502 using the Bluetooth LE Audio connection. For example, as discussed above with respect to FIG. 3, poor link conditions may result from cross-body attenuation. Communication between an audio source 502 and a first earbud 504-1 may experience cross-body attenuation and/or other interference in such a way that audio packets transmitted to the first earbud 504-1 may be not properly received by the first earbud 504-1 while audio packets transmitted to the second earbud 504-2 may be properly received by the second earbud 504-2.

As shown in FIG. 6, wireless link conditions between the audio source 502 and the first earbud 504-1 may be poor while wireless link conditions between the audio source 502 and the second earbud 504-2 may be good. In the case of poor wireless link conditions between the audio source 502 and the first earbud 504-1, audio packets 580-1, 584-1 transmitted by the audio source 502 in the first Subevent of the first CIS Event 530-1 of the first ISO_Interval 570-1 and in the first Subevent of a second CIS Event 530-2 of a third ISO_Interval may not be properly received by the first earbud 504-1 or acknowledged as being properly received by the first earbud 504-1. As such, acknowledgement packets may be not sent by the first earbud 504-1 to the audio source 502 in the first Subevents or, if sent, may not be properly received by the audio source 502. In response, the audio source 502 can retransmit the audio packets 580-1, 584-1 to the first earbud 504-1 in the second Subevents of the first CIS Event 530-1, 530-2 of the first ISO_Interval 570-1 and the third ISO_Interval. In the case the first earbud 504-1 receives the retransmitted audio packets 580-1, 584-1, the first earbud 504-1 can send acknowledgement packets 582-1, 586-1 to the audio source 502 to notify the audio source 502 that the retransmitted packets 580-1, 584-1 were properly received by the first earbud 504-1. On the other hand, because the wireless link conditions between the audio source 502 and the second earbud 504-2 are good, audio packets 580-2, 584-2 transmitted by the audio source 502 in the first Subevents of the first CIS Events 540-1, 540-2 of the second ISO_Interval 570-2 and fourth ISO_Interval are properly received by the second earbud 504-2. As such, the second earbud 504-2 can send acknowledgement packets 582-2, 586-2 to the audio source 502.

To configure the first and second CISes for the first and second earbuds 504-1, 504-2, the audio source 502 can determine a set of parameters for configuring the first and second CISes. In some implementations, the set of parameters for configuring the first CIS can be the same as the set of parameters for configuring the second CIS. In other implementations, the set of parameters for configuring the first CIS can be different than the set of parameters for configuring the second CIS. The set of parameters can include an NSE value, a FT value, a BN value. The NSE value defines the number of Subevents per ISO_Interval. The first and second CISes, as shown in FIGS. 5 and 6, includes three Subevents per ISO_Interval and, accordingly, are configured with an NSE value that defines three Subevents per ISO_Interval. By changing the number of Subevents per ISO_Interval, the number audio packet transmission and retransmission opportunities per ISO_Interval can be adjusted. The FT value defines the number of consecutive ISO_Intervals that can be used to transmit an audio packet before the audio packet is discarded. In the first and second CISes, as shown in FIGS. 5 and 6, the opportunity to transmit the audio packets 580-1, 580-2 to the first and second earbuds 504-1, 504-2 is provided by one ISO_Interval 570-1, 570-2 for each of the first and second CISes, and, accordingly, are configured with an FT value that defines that one ISO_Interval per audio packet. In the event the audio packets 580-1, 580-2 are not received by the first and second earbuds 504-1, 504-2 in the ISO_Intervals 570-1, 570-2, they will be discarded and audio packets 584-1, 584-2 will be transmitted by the audio source 502 in the respective ISO_Intervals. The BN value defines the number of different audio packets that can be transmitted in each CIS Event. For example, first and second audio packets transmitted in a single CIS Event. In this way, Subevents in each ISO_Interval can be reserved for transmission of more than one audio packet. In the first and second CISes, as shown in FIGS. 5 and 6, the Subevents of each CIG Event in each ISO_Interval are reserved for transmission of one audio packet, and, accordingly, are configured with a BT value that defines the number of different audio packets per CIG Event. The foregoing set of parameters are not intended to be limiting and may include other parameters for configuring a CIS.

Collectively, the set of parameters for configuring a CIS can be used to balance robustness (i.e., minimal to no audio glitches) and latency of an audio stream. For example, for audio output applications that benefit from robustness of the audio stream over latency of the audio stream (e.g., a music playback application), the NSE value can be set to provide multiple audio packet retransmission opportunities in each ISO_Interval (e.g., 5 Subevents per ISO_Interval) and the FT value can be set to provide multiple ISO_Intervals for transmission of the same audio packet (e.g., 4 ISO_Intervals). In another example, for audio output applications that benefit from latency of the audio stream over robustness of the audio stream (e.g., a gaming application in which the audio of the gaming application is to be synchronized with the display of video of the gaming application), the NSE value can be set to provide one audio packet retransmission opportunity per ISO_Interval and one ISO_Interval for transmission of the audio packet.

As discussed above, the techniques described herein provide a communication technique for dynamically changing parameters for configuring a CIS without tearing down the CIS and reestablishing a new CIS. By dynamically modifying CIS parameters of an established CIS, robustness and latency of an audio stream can be optimized for each desired audio output application without introducing additional latency, increasing power consumption, and reducing available wireless bandwidth. As such, with the features described herein, a user can be provided with a consistent listening experience even when listening to audio output associated with different applications in which audio is output.

In some implementations, the communication technique includes determining that audio that is to be output to an audio output device, such as a set of true wireless earbuds, is associated with a first application of a plurality of applications and, in response to determining that the audio that is to be output to the audio output device is associated with the first application, determining a set of parameters for modifying a CIS of a wireless link between an audio source and the audio output device. Prior to determining the set of parameters for modifying the CIS of the wireless link between the audio source and the audio output device, a determination can be made that an amount of data stored in a buffer of the audio source is greater than a first predetermined threshold and that an amount of data stored in a buffer of the audio output device is less than a second predetermined threshold. In response to determining that the amount of data stored in the buffer of the audio source is greater than the first predetermined threshold and determining that the amount of data stored in the buffer of the audio output device is less than the second predetermined threshold, the set of parameters for modifying the CIS of the wireless link between the audio source and the audio output device can be determined.

The CIS can be modified based on the set of parameters to form a modified CIS and audio associated with the first application can be output to the audio output device using the modified CIS. Prior to determining that the audio that is to be output to the audio output device is associated with the first application, the wireless link including the CIS between the audio source and the audio output device can be established and audio associated with a second application of the plurality of applications can be output to the audio output device using the CIS. The set of parameters for modifying the CIS can be based on a determined link condition score of the wireless link between the audio source and the audio output device. The set of parameters for modifying the CIS can include at least one of a NSE value, a FT value, and a BN value for the CIS. Also, modifying the CIS based on the set of parameters can include modifying a CIS for a first earbud of the set of true wireless earbuds and a CIS for a second earbud of the set of true wireless earbuds. The plurality of applications can include an application that is configured to output synchronized audio and video such as a gaming application and an application that is configured to output audio such as a music playback application.

Figure 7:
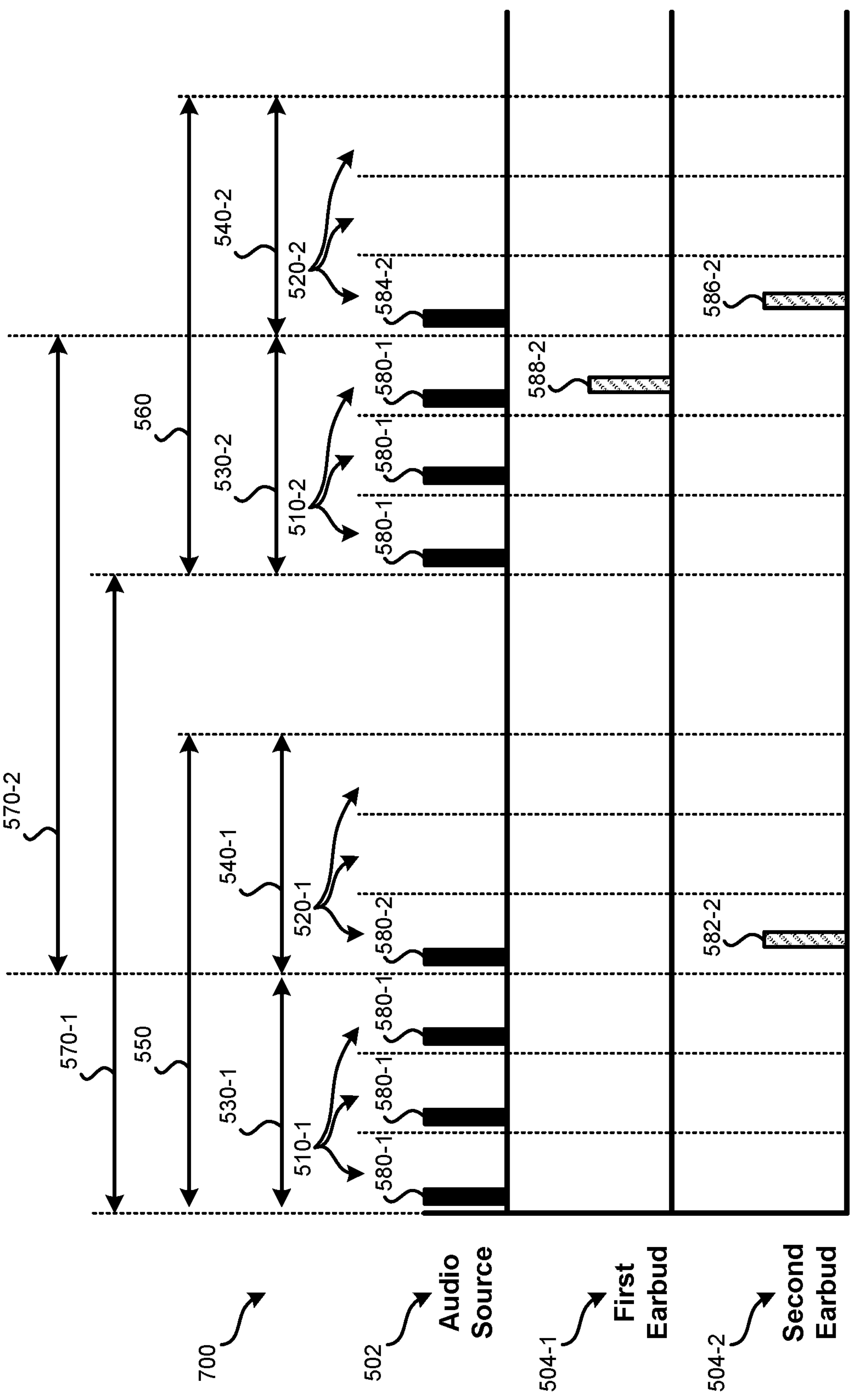
FIG. 7 illustrates an embodiment of a communication technique for outputting audio associated with an application from an audio source to an audio output device according to various embodiments.

FIG. 7 illustrates an embodiment of a communication technique 700 for outputting audio associated with an application from an audio source 502 to an audio output device. In some implementations, the application can be an application that is configured to output audio and benefits from robustness of the audio stream such as a music playback application. As discussed above, the wireless link conditions between the audio source 502 and the first earbud 504-1 may be poor while the wireless link conditions between the audio source 502 and the second earbud 504-2 may be good. The audio source 502 can determine that the audio that is to be output to the first and second earbuds 504-1, 504-2 is associated with a music playback application which can benefit from robustness of the audio stream and, in response, determine a set of parameters for modifying the CISes to optimize audio playback for the music playback application without tearing down the CISes and reestablishing new CISes.

Prior to determining the set of parameters, a check can be made to determine that an amount of data stored in a buffer of the audio source 502 is greater than a first predetermined threshold and that an amount of data stored in buffers of the first and second earbuds 504-1, 504-2 is less than a second predetermined threshold. A check can also be made to determine the wireless link conditions between the audio source 502 and the first and second earbuds 504-1, 504-2 and a wireless link condition score can be determined based on the wireless link conditions. In some implementations, the wireless link condition score can be determined by measuring a plurality of characteristics of the wireless link, determining a score for each characteristic of the plurality of characteristics, and averaging the scores to determine the wireless link condition score. In some implementations, the plurality of characteristics can include PER, SNR, RSSI, and the like. In some implementations, a score can be determined for each characteristic of the plurality of characteristics by dividing a measured value for each respective characteristic to a predetermined value.

In response to determining that the amount of data stored in the buffers are respectively greater than and less than the first and second predetermined thresholds and determining the wireless link condition score, the set of parameters for modifying the CIS to optimize robustness of the audio stream can be determined. For example, the NSE value can be set to provide multiple audio packet retransmission opportunities in each ISO_Interval (e.g., 3 Subevents per ISO_Interval) and the FT value can be set to provide multiple ISO_Intervals for transmission of the same audio packet (e.g., 2 ISO_Intervals). As shown in FIG. 7, the first and second CISes can be configured to provide 3 Subevents for the first and second CIS Events 530-1, 530-2, 540-1, 540-2 for each ISO_Interval 570-1, 570-2 of the first and second CISes and to provide 2 ISO_Intervals in which the audio packets 580-1, 580-2, 584-2 can be transmitted and retransmitted. As further shown in FIG. 7, in the case of poor wireless link conditions between the audio source 502 and the first earbud 504-1, the audio packet 580-1 is first acknowledged by the first earbud 504-1 as being properly received by the first earbud 504-1 in the third Subevent of the second CIG Event 530-2 of the first CIS. In the case of good wireless link conditions between the audio source 502 and the second earbud 504-2, the audio packet 580-2 is first acknowledged by the second earbud 504-2 as being properly received by the second earbud 504-2 in the first Subevent of the first CIG Event 540-1 of the second CIS which allows another audio packet 584-2 to be transmitted in the first Subevent of the second CIG Event 520-2 of the second CIS.

In some implementations, the set of parameters can be determined based on the wireless link condition score. A data storage device can store one or more data structures that associate a plurality of sets of CIS parameters for each respective application. For each respective application, different sets of CIS parameters can be associated with different wireless link condition scores. For example, for a first application and a determined wireless link condition score, a set of CIS parameters for that first application that correspond to the determined wireless link condition score can be extracted from the data storage device. In this way, a set of CIS parameters can be extracted from the data storage device based on the application in which associated audio is to be output and a current wireless link condition of the wireless link between the audio source and the audio output device. The CIS can be modified based on the set of parameters to form a modified CIS and audio associated with the musical playback application can be output to the first and second earbuds 504-1, 504-2 using the modified CIS.

Figure 8:
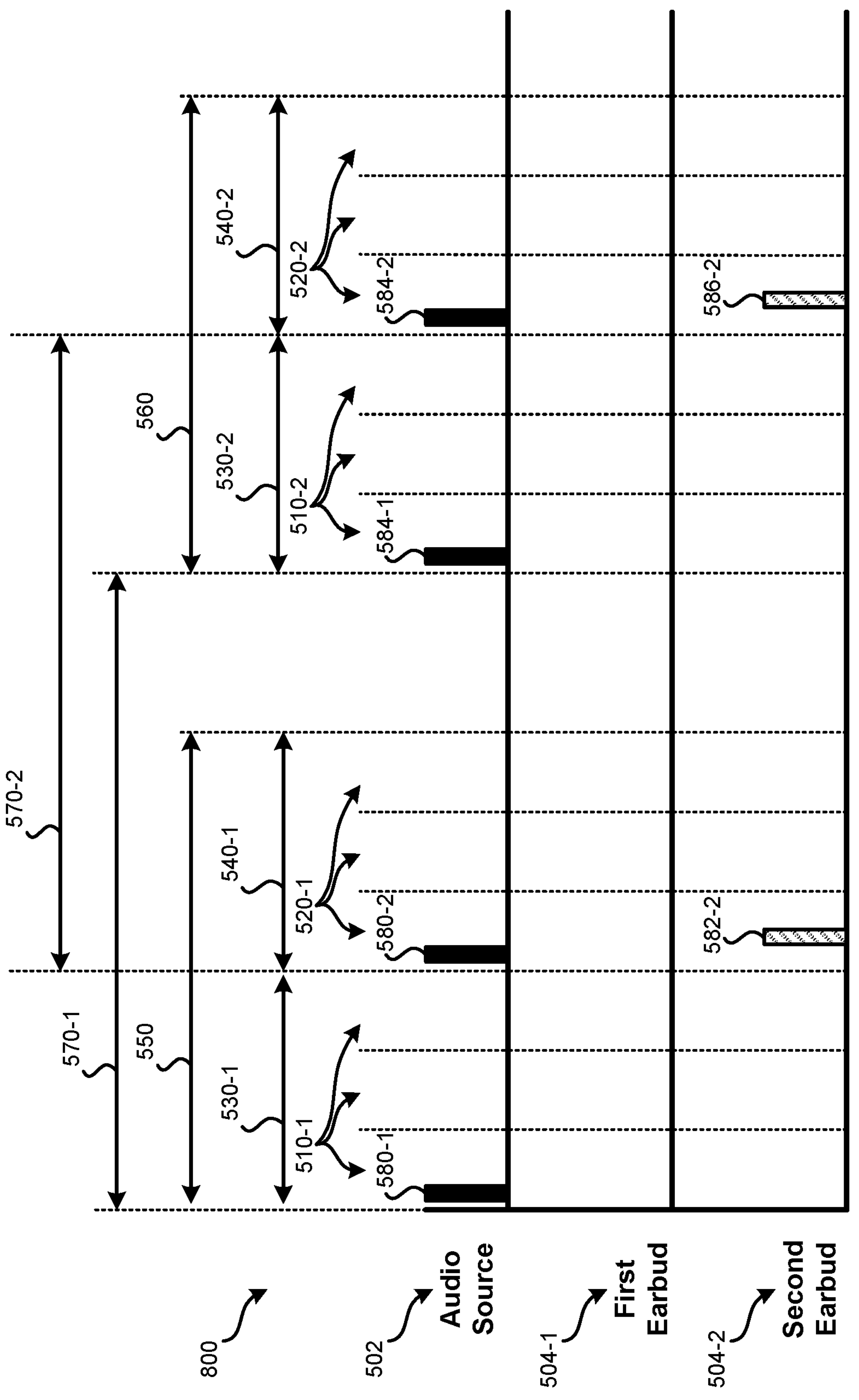
FIG. 8 illustrates another embodiment of a communication technique for outputting audio associated with an application from an audio source to an audio output device according to various embodiments.

FIG. 8 illustrates an embodiment of a communication technique 800 for outputting audio associated with an application from an audio source 502 to an audio output device. In some implementations, the application can be an application that is configured to output synchronized audio and video such as a gaming application and benefits from low latency such as a gaming application. As discussed above, the wireless link conditions between the audio source 502 and the first earbud 504-1 may be poor while the wireless link conditions between the audio source 502 and the second earbud 504-2 may be good. However, the audio source 502 can determine that the audio that is to be output to the first and second earbuds 504-1, 504-2 is associated with a gaming application which can benefit from low latency of the audio stream and, in response, determine a set of parameters for modifying the CISes to optimize audio playback for the gaming application without tearing down the CISes and reestablishing new CISes.

Prior to determining the set of parameters, a check can be made to determine that an amount of data stored in a buffer of the audio source 502 is greater than a first predetermined threshold and that an amount of data stored in buffers of the first and second earbuds 504-1, 504-2 is less than a second predetermined threshold. A check can also be made to determine the wireless link conditions between the audio source 502 and the first and second earbuds 504-1, 504-2 and a wireless link condition score can be determined based on the wireless link conditions. However, in some implementations, in applications in which low latency is optimized, the set of parameters may be determined or extracted without checking to determine whether the amount of data stored in the buffers satisfy predetermined thresholds or determining the wireless link condition score. In this case, the set of parameters may be extracted solely on the basis of the audio output application that the audio that is to be output is associated with.

The set of parameters for modifying the CIS based on the audio output application. For example, the NSE value can be set to provide no audio packet retransmission opportunities in each ISO_Interval (e.g., 1 Subevents per ISO_Interval) and the FT value can be set to provide a single ISO_Interval for transmission of the same audio packet (e.g., 1 ISO_Interval). As shown in FIG. 8, the first and second CISes can be configured to provide 1 Subevent for each of the first and second CIS Events 530-1, 530-2, 540-1, 540-2 of each ISO_Interval 570-1, 570-2 of the first and second CISes and to provide 1 ISO_Interval in which the audio packets 580-1, 580-2, 584-1, and 584-2 can be transmitted. As further shown in FIG. 8, even in the case of poor wireless link conditions between the audio source 502 and the first earbud 504-1, the audio packet 580-1 is not acknowledged by the first earbud 504-1 as being properly received by the first earbud 504-1 in the first Subevent of the first CIG Event 530-1 of the first CIS, but a different audio packet 584-1 is transmitted in the first Subevent of the second CIG Event 530-2 of the first CIS. In the case of good wireless link conditions between the audio source 502 and the second earbud 504-2, the audio packet 580-2 is first acknowledged by the second earbud 504-2 as being properly received by the second earbud 504-2 in the first Subevent of the first CIG Event 540-1 of the second CIS and regardless of the acknowledgement a different audio packet 584-2 will be transmitted in the first Subevent of the second CIG Event 520-2 of the second CIS.

As discussed above, the set of parameters for modifying the CIS can be determined based upon detecting that the audio that is to be output is associated with a particular application. However, the foregoing is not intended to be limiting and there can be other situations in which the parameters of an established CIS can be modified without tearing the established CIS and reestablishing a new CIS. For example, another set of parameters for modifying the CIS can be determined while the audio that is associated with the particular application is being output by the audio source 502.

In some implementations, to output audio to the first and second earbuds 504-1, 504-2, audio packets can be stored in a buffer of the audio source 502 and the stored audio packets can be transmitted to the first and second earbuds 504-1, 504-2 using the modified CISes. While audio associated with an application is being output by the audio source 502, the wireless link conditions between the audio source 502 and the first and second earbuds 504-1, 504-2 can deteriorate, which can affect the desired robustness and latency of the audio stream and overall user experience while listening to the audio. For example, when the wireless link conditions between the audio source and the first earbud 504-1 and/or the second earbud 504-2 deteriorate, the first earbud 504-1 and/or second earbud 504-2 may not send acknowledgement packets to the audio source 502 and/or the audio source 502 may not properly receive any acknowledgment packets sent by the first and/or second earbuds 504-1, 504-2. Depending on the set of parameters for the first and second CISes that were determined upon detecting that audio associated with an application is to be output (e.g., the NSE values, FT values, and BN values for the first and second CISes), audio packets waiting to be transmitted to the first and second 504-1, 504-2 may collect in the buffer of the audio source 502. As such, the amount of audio packets stored in the buffer of the audio source 502 can reach or exceed a predetermined threshold such as the capacity of the buffer of the audio source 502 and a user may experience audio glitches and/or other interruptions while listening to audio associated with a particular application.

Figure 9:
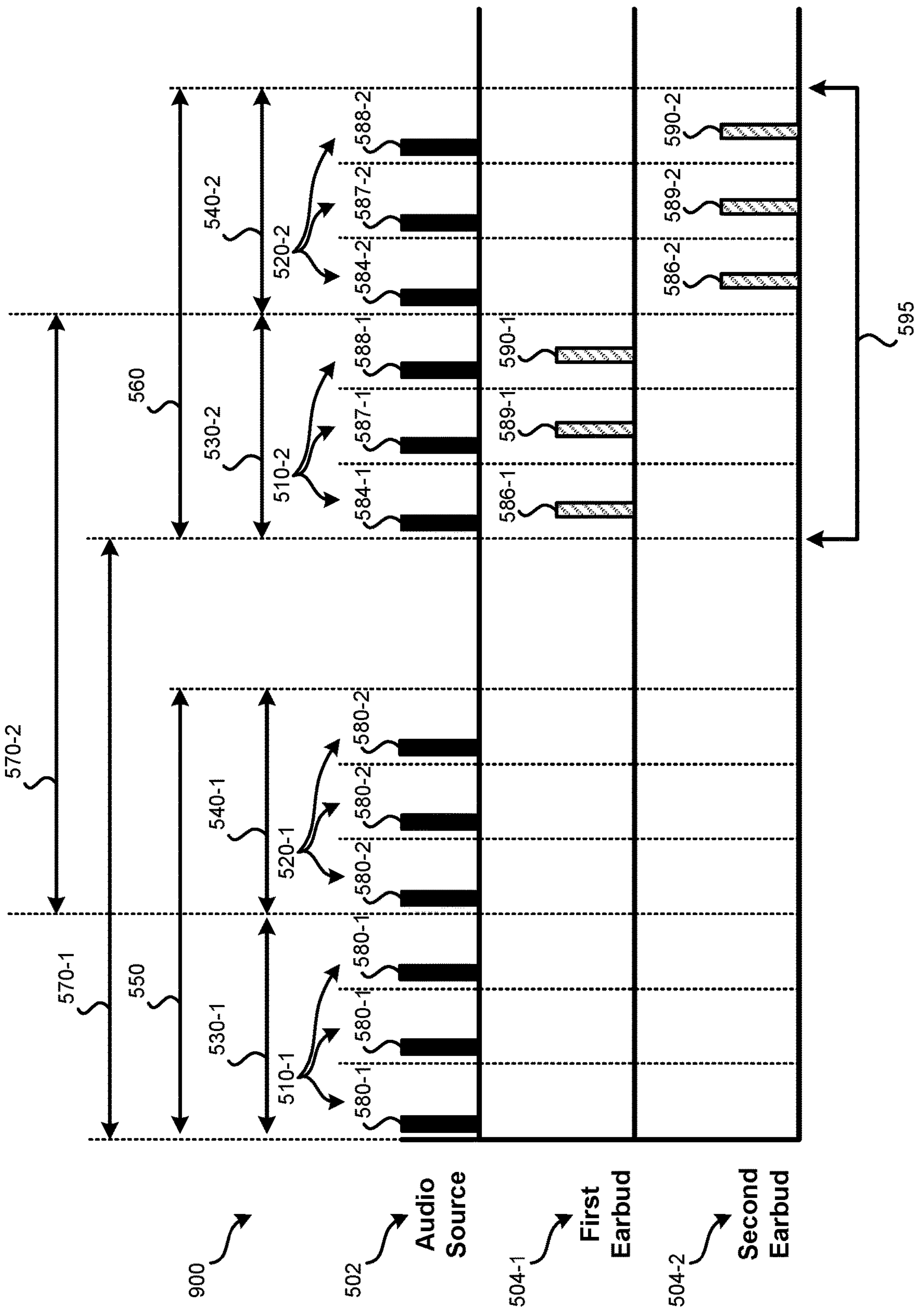
FIG. 9 illustrates another embodiment of a communication technique for outputting audio associated with an application from an audio source to an audio output device according to various embodiments.

To compensate for the foregoing challenges and/or others, while audio is being output by the audio source 502, the CIS used to transmit the audio can be modified and/or further modified and the audio source 502 can enter in a boost transmission mode. For example, as shown in FIG. 9, which illustrates another embodiment of a communication technique 900 for outputting audio associated with an application from an audio source 502 to an audio output device, while audio associated with an application is being output by the audio source 502 poor wireless link conditions can exist between the audio source 502 and the first and second earbuds 504-1, 504-2 during the first CIS Events 530-1, 540-1. As such, audio packets 580-1, 580-2 can be transmitted and retransmitted in the first three Subevents of the first CIS Events 530-1, 540-1. In turn, depending on the set of parameters used to configure the first and second CISes and the frame rate of the audio packets, audio packets waiting to be transmitted by the audio source 502 may collect in the buffer of the audio source 502 and the number of audio packets stored in the buffer of the audio source 502 can reach or exceed the predetermined threshold such as the capacity of the buffer of the audio source 502.

When the number of audio packets stored in the buffer of the audio source 502 equals and/or exceeds the capacity of the buffer of the audio source 502, the first and second CISes can be modified to reduce the number of opportunities for retransmission of an audio packet. For example, in the case that an FT value of the first CIS and/or the second CIS is greater than 1, the FT value of the first CIS and/or the second CIS can be set to 1 such that just a single ISO_Interval in the first and second CISes can be reserved for transmission and/or retransmission of audio packets before those audio packets are discarded. Additionally, or alternatively, when the number of audio packets stored in the buffer of the audio source 502 equals and/or exceeds the capacity of the buffer of the audio source 502, the audio source 502 can enter into a boost transmission mode 595 in which the transmission power of a wireless communication interface such as wireless communication interface 270 (FIG. 2) can be increased and/or the signals corresponding to the audio packets can be transmitted using a beamforming technique. The foregoing techniques are not intended to be limiting and other techniques for boosting transmission of the audio signals corresponding the audio packets can be utilized.

Additionally, or alternatively, in some implementations, a link condition score for the wireless link between the audio source 502 and the first and second earbuds 504-1, 504-2 can be determined and compared to a predetermined threshold for the wireless link. In response to determining that the link condition score for the wireless link between the audio source and the first and second earbuds 504-1, 504-2 is below the predetermined threshold for the wireless link, the first and second CISes can be modified to reduce the number of opportunities for retransmission of an audio packet and/or the audio source 502 can enter into the boost transmission mode 595. As discussed above, the link condition score can be determined by measuring a plurality of characteristics of the wireless link, determining a score for each characteristic of the plurality of characteristics, and averaging the scores to determine the wireless link condition score. In some implementations, the plurality of characteristics can include PER, SNR, RSSI, and the like. In some implementations, a score can be determined for each characteristic of the plurality of characteristics by dividing a measured value for each respective characteristic to a predetermined value.

In some implementations, once an acknowledgement packet is received from the first earbud 504-1 and/or the second earbud 504-2, additional audio packets stored in the buffer of the audio source 502 can be transmitted to the first and second earbuds 504-1, 504-2 while the audio source 502 is in the boost transmission mode 595 and using the modified and/or further modified first and second CISes. For example, as shown in FIG. 9, the audio source 502 can enter into the boost transmission mode 595 after the first CIS Events 530-1, 540-1, which may cause the audio packets 584-1, 584-2 to be properly received by the first and second earbuds 504-1, 504-2. In response, the first and second earbuds 504-1, 504-2 can transmit acknowledgement packets 586-1, 586-2 to the audio source 502. The audio source 502 can then transmit audio packets 587-1, 587-2 to the first and second earbuds 504-1, 504-2 and receive acknowledgement packets 589-1, 589-2 in response. While in the boost transmission mode 595, the buffer of the audio source 502 can be flushed by repeating this process (e.g., by transmitting audio packets 588-1, 588-2 and receiving acknowledgement packets 590-1, 590-2 in response). In some implementations, the buffer of the audio source 502 can be considered flushed when it is empty and/or when the number of audio packets stored in the buffer of the audio source 502 is less than another predetermined threshold such as a predetermined number of audio packets.

In some implementations, when buffer of the audio source 502 has been flushed, the audio source 502 can exit the boost transmission mode 595 by decreasing the transmission power of the wireless communication interface to its previous state and/or another reduced state and/or by transmitting signals corresponding the audio packets using the previous transmission technique and/or another transmission technique. Additionally, or alternatively, the configurations of the first and second CISes can revert back to their earlier configurations (i.e., the parameters of each CIS can revert back to their previous parameters) and/or another suitable configuration.

Figure 10A:
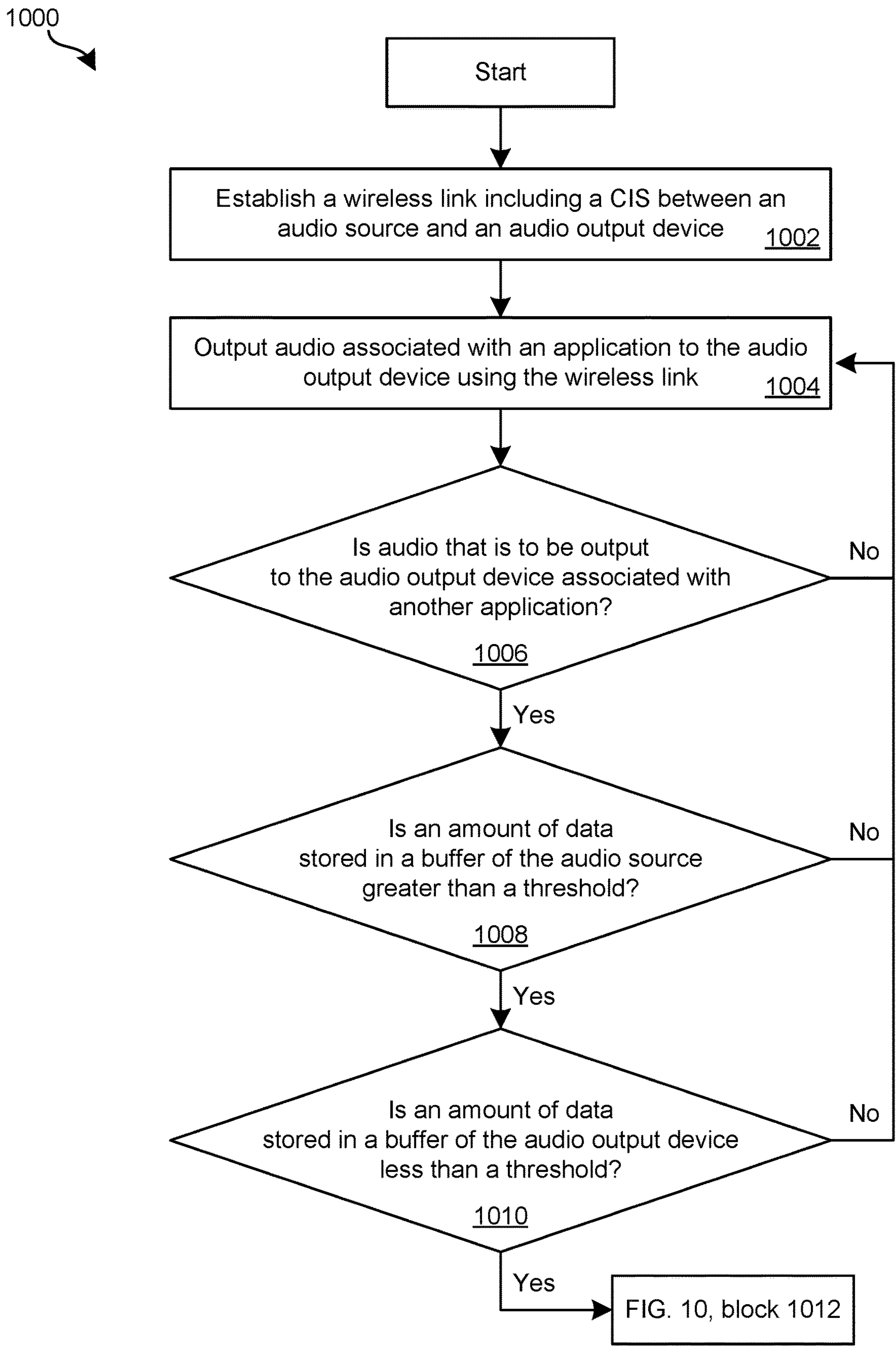
FIGS. 10A and 10B illustrate an embodiment of a method for wirelessly providing an audio stream according to various embodiments.
Figure 10B:
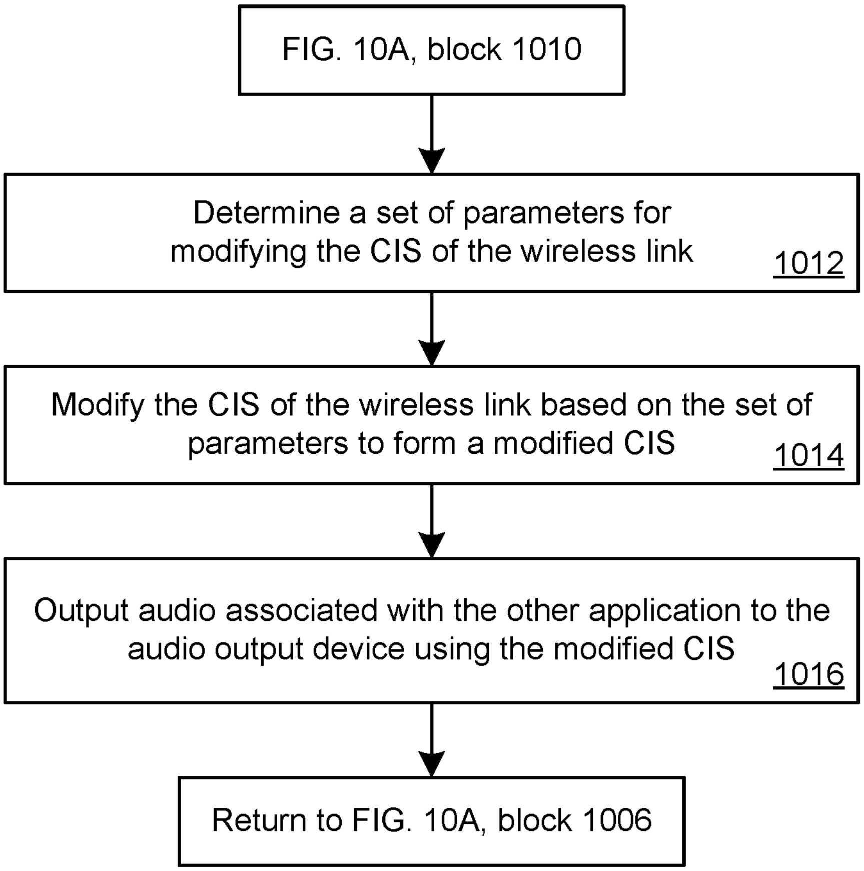

FIGS. 10A and 10B illustrate an embodiment of a method 1000 for wirelessly providing an audio stream. The processing depicted in FIGS. 10A and 10B may be implemented in software (e.g., code, instructions, program) executed by a processing system such as a processing system of the audio source 502, the first earbud 504-1, and/or the second earbud 504-2. The software may be stored on a non-transitory computer-readable storage medium (e.g., a memory device). The method 1000 is intended to be illustrative and non-limiting. For example, although FIGS. 10A and 10B depict the various processing steps occurring in a particular sequence or order, in other embodiments, the steps may be performed in some different order or some steps may also be performed in parallel.

At block 1002, a wireless link is established between an audio source and an audio output device. In some implementations, the audio source can be the audio source 502 and the audio output device can be a set of true wireless earbuds such as first earbud 504-1 and second earbud 504-2. In some implementations, the wireless link can be a Bluetooth LE Audio link and can include one or more CISes.

At block 1004, audio associated with an application is output to the audio output device using a CIS of the wireless link. In some implementations, the application is one of a plurality of applications. For example, a first application of the plurality of applications can be an application that is configured to output synchronized audio and video such as a gaming application and a second application of the plurality of applications can be an application that is configured to output audio such as a music playback application. In some implementations, the audio source can output audio to the audio output device by storing audio packets in a buffer of the audio source and transmitting stored audio packets to the audio output device using the CIS of the wireless link. In some implementations, the audio associated with the application can be output to the audio output device according to the method 1100 shown in FIG. 11.

At block 1006, a determination is made as to whether audio that is to be output to the audio output device is associated with another application of the plurality of applications. As discussed with respect to block 904, audio associated with an application (e.g., a first application) is output to the audio output device. In some implementations, a user of the audio source may wish to use another application and provide an input to the audio source that causes the audio source to switch to the other application (e.g., a second application). For example, a user of the audio source may be listening to audio associated with a gaming application running or executing on the audio source but may then decide to switch to a music application to listen to audio associated with the music application. The other application may have associated audio. A determination can be made as to whether the audio that is to be output as a result of application change is associated with the other application. To restate, a determination can be made as to whether the audio source will continue to output audio associated with first application or output audio associated with the second application. In the event the audio that is to be output to the audio output device is associated with another application of the plurality of applications, the method 1000 continues to block 1008. On the other hand, in the event that audio source will continue to output audio associated with first application, the method 1000 returns to block 1004.

At block 1008, a determination is made as to whether an amount of data stored in a buffer of the audio source is greater than a first predetermined threshold. In some implementations, the first predetermined threshold can correspond to a number of audio packets and a determination can be made as to whether the number of audio packets stored in the buffer of the audio source is greater than a predetermined number of audio packets. In the event that the amount of data stored in the buffer of the audio source is greater than the first predetermined threshold, the method 1000 continues to block 1010. On the other hand, in the event that the amount of data stored in the buffer of the audio source is less than the first predetermined threshold, the method 1000 returns to block 1004.

At block 1010, a determination is made as to whether an amount of data stored in a buffer of the audio output device is less than a second predetermined threshold. In some implementations, the second predetermined threshold can correspond to a number of audio packets and a determination can be made as to whether the number of audio packets stored in the buffer of the audio output device is less than a predetermined number of audio packets. In the event that the amount of data stored in the buffer of the audio output device is less than the second predetermined threshold, the method 1000 continues to block 1012. On the other hand, in the event that the amount of data stored in the buffer of the audio output device is greater than the second predetermined threshold, the method 1000 returns to block 1004.

At block 1012, a set of parameters for modifying the CIS of the wireless link can be determined. In some implementations, the set of parameters can be determined based on a link condition score of the wireless link. In some implementations, a link condition score of the wireless link can be determined, and the set of parameters can be determined based on the link condition score. In some implementations, a data storage device can store one or more data structures that associate a plurality of sets of CIS parameters for each respective application. For each respective application, different sets of CIS parameters can be associated with different wireless link condition scores. For example, for a first application and a determined wireless link condition score, a set of CIS parameters for that first application that correspond to the determined wireless link condition score can be extracted from the data storage device. In this way, a set of CIS parameters can be extracted from the data storage device based on the application in which associated audio is to be output and a current wireless link condition of the wireless link between the audio source and the audio output device. In some implementations, the wireless link condition score can be determined by measuring a plurality of characteristics of the wireless link, determining a score for each characteristic of the plurality of characteristics, and averaging the scores to determine a wireless link condition score. In some implementations, the plurality of characteristics can include PER, SNR, RSSI, and the like. In some implementations, a score can be determined for each characteristic of the plurality of characteristics by dividing a measured value for each respective characteristic to a predetermined value. In some implementations, the set of parameters for modifying the CIS includes an NSE value, a FT value, and/or a BN value for the CIS.

At block 1014, the CIS is modified based on the set of parameters to form a modified CIS. In some implementations, modifying the CIS based on the set of parameters includes modifying a CIS for the first earbud of the set of true wireless earbuds and modifying a CIS for the second earbud of the set of true wireless earbuds.

At block 1016, audio associated with the other application is output to the audio output device using the modified CIS. As discussed with respect to block 904, audio associated with an application (e.g., a first application) is output to the audio output device. In some implementations, a user of the audio source may wish to use another application and provide an input to the audio source that causes the audio source to switch to the other application (e.g., a second application). For example, a user of the audio source may be listening to audio associated with a gaming application running or executing on the audio source but may then decide to switch to a music application to listen to audio associated with the music application. The other application may have associated audio. Audio associated with the other application can be output to the audio output device using the modified CIS. In some implementations, the audio associated with the other application can be output to the audio output device according to the method 1100 shown in FIG. 11. While the audio associated with the other application is being output to the audio output device, the method can return to block 1006 where another determination can be made as to whether audio that is to be output to the audio output device is associated with another application of the plurality of applications (e.g., as the result of a switch to a third application).

Figure 11:
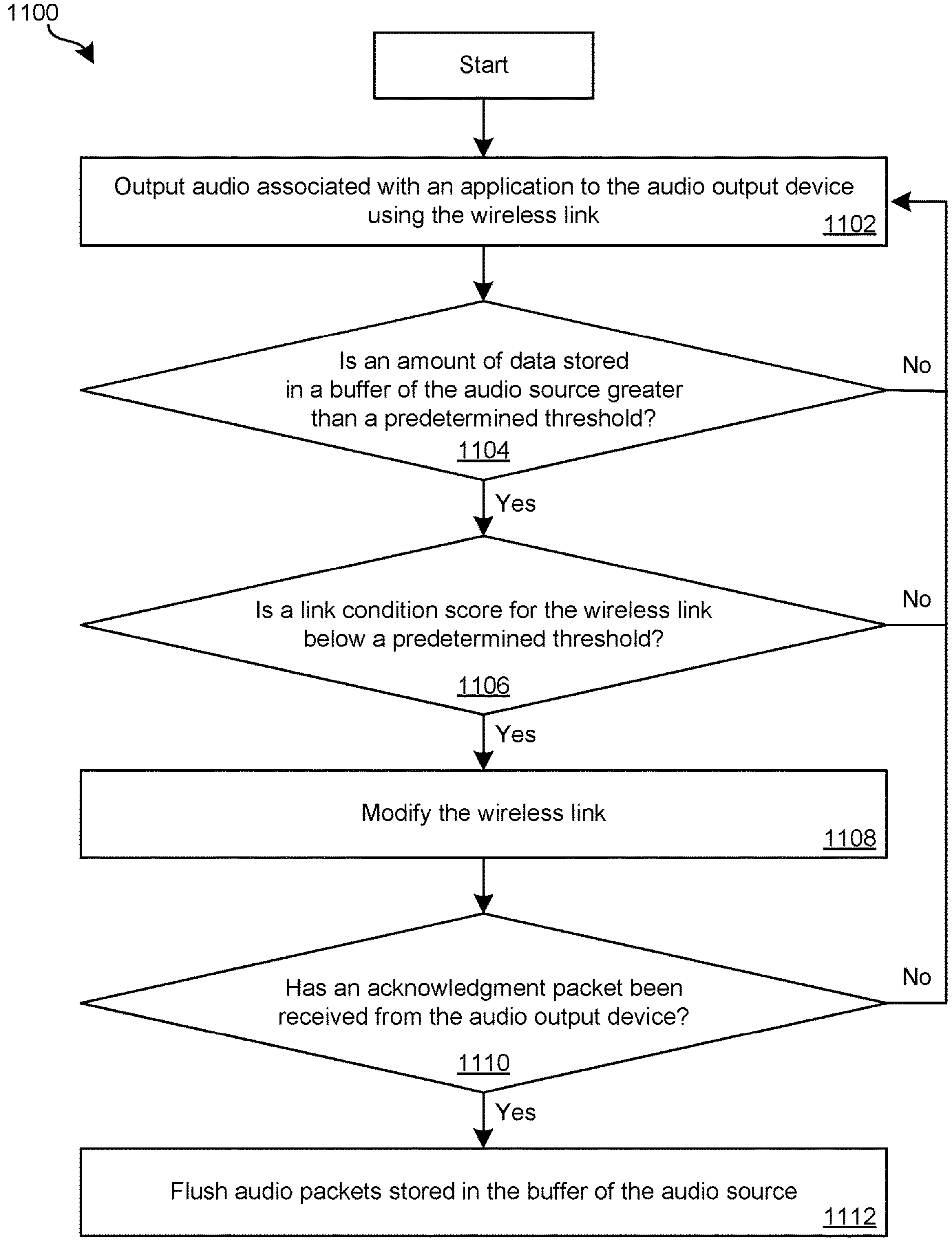
FIG. 11 illustrates another embodiment of a method for wirelessly providing an audio stream according to various embodiments.

FIG. 11 illustrates an embodiment of a method 1100 for wirelessly providing an audio stream. The processing depicted in FIG. 11 may be implemented in software (e.g., code, instructions, program) executed by a processing system such as a processing system of the audio source 502, the first earbud 504-1, and/or the second earbud 504-2. The software may be stored on a non-transitory computer-readable storage medium (e.g., a memory device). The method 1100 is intended to be illustrative and non-limiting. For example, although FIG. 11 depicts the various processing steps occurring in a particular sequence or order, in other embodiments, the steps may be performed in some different order or some steps may also be performed in parallel.

At block 1102, audio associated with an application is output to an audio output device using a CIS of a wireless link between an audio source and the audio output device. The audio source can be the audio source 502 and the audio output device can be a set of true wireless earbuds such as first earbud 504-1 and second earbud 504-2. In some implementations, the wireless link can be a Bluetooth LE Audio link and can include one or more CISes. In some implementations, the application is one of a plurality of applications. For example, a first application of the plurality of applications can be an application that is configured to output synchronized audio and video such as a gaming application and a second application of the plurality of applications can be an application that is configured to output audio such as a music playback application. In some implementations, the audio source can output audio to the audio output device by storing audio packets in a buffer of the audio source and transmitting stored audio packets to the audio output device using the CIS of the wireless link.

At block 1104, a determination is made as to whether an amount of data stored in a buffer of the audio source is greater than a predetermined threshold for the buffer of the audio source. In some implementations, the predetermined threshold for the buffer of the audio source can correspond to a number of audio packets and a determination can be made as to whether the number of audio packets stored in the buffer of the audio source is greater than the predetermined number of audio packets. In the event that the amount of data stored in the buffer of the audio source is greater than the predetermined threshold for the buffer of the audio source, the method 1100 continues to block 1106. On the other hand, in the event that the amount of data stored in the buffer of the audio source is less than the predetermined threshold for the buffer of the audio source, the method 1100 returns to block 1102.

At block 1106, a determination is made as to whether a link condition score for the wireless link between the audio source and the audio output device is below a predetermined threshold for the wireless link. In some implementations, the link condition score for the wireless link can be determined by measuring a plurality of characteristics of the wireless link, determining a score for each characteristic of the plurality of characteristics, and averaging the scores to determine a link condition score for the wireless link. In some implementations, the plurality of characteristics can include a PER, an SNR, a RSS), and the like. In some implementations, a score can be determined for each characteristic of the plurality of characteristics by dividing a measured value for each respective characteristic to a predetermined value. In the event that the link condition score for the wireless link is greater than the predetermined threshold for the wireless link, the method 1100 continues to block 1108. On the other hand, in the event that the link condition score for the wireless link is less than the predetermined threshold for the wireless link, the method 1100 returns to block 1102.

At block 1108, the wireless link between the audio source and the audio output device is modified. In some implementations, the wireless link between the audio source and the audio output device can be modified by modifying a FT value for the CIS, increasing transmission power of a wireless communication interface of the audio source, and/or transmitting wireless signals from the audio source using a beamforming technique. The foregoing is not intended to be limiting and the wireless link between the audio source and the audio output device can be modified by modifying other parameters of the CIS such as an NSE value and/or a BN value for the CIS of the wireless link.

At block 1110, a determination can be made as to whether an acknowledgement packet has been received from the audio output device. In some implementations, the acknowledgement packet can serve to notify the audio source that an audio packet transmitted to the audio output device from the audio source was properly received by the audio output device. In some implementations, when an audio packet addressed to a first earbud of the audio output device is properly received by the first earbud, the first earbud can transmit an acknowledgement packet to the audio source. Similarly, when an audio packet addressed to a second earbud of the audio output device is properly received by the second earbud, the second earbud can transmit an acknowledgement packet to the audio source. In the event that an acknowledgement packet has been received from the audio output device, the method 1100 continues to block 1112. On the other hand, in the event that an acknowledgement packet has not been received from the audio output device, the method 1100 returns to block 1102.

At block 1112, the audio packets stored in the buffer of the audio source are flushed. To flush the audio packets from the buffer of the audio source, additional audio packets stored in the buffer of the audio source can be transmitted to the audio output device while the wireless link between the audio source and the audio output device is modified. For example, while the wireless link between the audio source and the audio output device is modified, the audio source can transmit audio packets to the audio output device and receive acknowledgement packets in response. The buffer of the audio source can be flushed by repeating this process (e.g., by transmitting audio packets and receiving acknowledgement packets in response). In some implementations, the buffer of the audio source can be considered flushed when it is empty and/or when the number of audio packets stored in the buffer of the audio source is less than another predetermined threshold such as a predetermined number of audio packets. In some implementations, when buffer of the audio source has been flushed, the transmission power of the wireless communication interface can be decreased to its previous state and/or another reduced state and/or signals corresponding the audio packets can be transmitted using the previous transmission technique and/or another transmission technique. Additionally, or alternatively, the configurations of the CIS can revert back to an earlier configuration (i.e., the parameters of the CIS can revert back to its previous parameters) and/or another suitable configuration.

The systems and methods of the present disclosure may be implemented using hardware, software, firmware, or a combination thereof and may be implemented in one or more computer systems or other processing systems. Some embodiments of the present disclosure include a system including a processing system that includes one or more processors. In some embodiments, the system includes a non-transitory computer readable storage medium containing instructions which, when executed on the one or more processors, cause the system and/or the one or more processors to perform part or all of one or more methods and/or part or all of one or more processes disclosed herein. Some embodiments of the present disclosure include a computer-program product tangibly embodied in a non-transitory machine-readable storage medium, including instructions configured to cause the system and/or the one or more processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification, and variation of the concepts herein disclosed may be resorted to by those skilled in the art, and that such modifications and variations are considered to be within the scope of this invention as defined by the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

What is claimed is:

1. A method for wirelessly providing an audio stream, the method comprising:
- outputting audio associated with a first application of a plurality of applications to an audio output device using a Connected Isochronous Stream (CIS) of a wireless link between an audio source and the audio output device;
- determining that a number of audio packets stored in a buffer of the audio source is greater than a predetermined threshold for the buffer of the audio source;
- modifying the wireless link between the audio source and the audio output device in response to determining that the number of audio packets stored in the buffer of the audio source is greater than the predetermined threshold;
- determining that an acknowledgement packet has been received from the audio output device after modifying the wireless link between the audio source and the audio output device; and
- in response to determining that the acknowledgement packet has been received from the audio output device and determining that the number of audio packets stored in the buffer of the audio source is greater than the predetermined threshold, flushing audio packets stored in the buffer of the audio source.

2. The method of claim 1, further comprising:
- determining that a link condition score for the wireless link between the audio source and the audio output device is below a predetermined threshold for the wireless link; and
- in response to determining that the link condition score for the wireless link between the audio source and the audio output device is below the predetermined threshold for the wireless link, modifying the wireless link between the audio source and the audio output device.

3. The method of claim 1, wherein modifying the wireless link between the audio source and the audio output device comprises modifying a Flush Timeout (FT) value for the CIS of the wireless link.

4. The method of claim 1, wherein modifying the wireless link between the audio source and the audio output device comprises increasing transmission power of a wireless communication interface of the audio source.

5. The method of claim 1, wherein modifying the wireless link between the audio source and the audio output device comprises transmitting signals using a beamforming technique.

6. The method of claim 1, wherein the audio output device is a set of true wireless earbuds.

7. The method of claim 1, further comprising:
- determining that audio that is to be output to the audio output device is associated with a second application of a plurality of applications;
- in response to determining that the audio that is to be output to the audio output device is associated with the second application, modifying the CIS of the wireless link based on a buffer size of the audio output device to form a modified CIS of the wireless link; and
- outputting audio associated with the second application to the audio output device using the modified CIS of the wireless link.

8. A system for wirelessly providing an audio stream, the system comprising:
- an audio output device; and
- an audio source, wherein the system is configured to:
  - output audio associated with a first application of a plurality of applications to an audio output device using a Connected Isochronous Stream (CIS) of a wireless link between an audio source and the audio output device;
  - determine that a number of audio packets stored in a buffer of the audio source is greater than a predetermined threshold for the buffer of the audio source;
  - modify the wireless link between the audio source and the audio output device;
  - determine that an acknowledgement packet has been received from the audio output device; and
  - in response to determining that the acknowledgement packet has been received from the audio output device after determining that the number of audio packets stored in the buffer of the audio source is greater than the predetermined threshold, flush audio packets stored in the buffer of the audio source.

9. The system of claim 8, wherein the system is further configured to:
- determine that a link condition score for the wireless link between the audio source and the audio output device is below a predetermined threshold for the wireless link; and
- in response to determining that the link condition score for the wireless link between the audio source and the audio output device is below the predetermined threshold for the wireless link, modify the wireless link between the audio source and the audio output device.

10. The system of claim 8, wherein modifying the wireless link between the audio source and the audio output device comprises modifying a Flush Timeout (FT) value for the CIS of the wireless link.

11. The system of claim 8, wherein modifying the wireless link between the audio source and the audio output device comprises increasing transmission power of a wireless communication interface of the audio source.

12. The system of claim 8, wherein modifying the wireless link between the audio source and the audio output device comprises transmitting signals using a beamforming technique.

13. The system of claim 8, wherein the audio output device is a set of true wireless earbuds.

14. The system of claim 8, wherein the system is further configured to:

determine that audio that is to be output to the audio output device is associated with a second application of a plurality of applications;

in response to determining that the audio that is to be output to the audio output device is associated with the second application, modify the CIS of the wireless link based on a buffer size of the audio output device to form a modified CIS of the wireless link; and output audio associated with the second application to the audio output device using the modified CIS of the wireless link.

15. One or more non-transitory computer-readable media storing instructions which, when executed by at least one processing system, cause a system to perform operations comprising:

outputting audio associated with a first application of a plurality of applications to an audio output device using a Connected Isochronous Stream (CIS) of a wireless link between an audio source and the audio output device;

determining that a number of audio packets stored in a buffer of the audio source is greater than a predetermined threshold for the buffer of the audio source;

modifying the wireless link between the audio source and the audio output device;

determining that an acknowledgement packet has been received from the audio output device; and in response to determining that the acknowledgement packet has been received from the audio output device after determining that the number of audio packets stored in the buffer of the audio source is greater than the predetermined threshold, flushing audio packets stored in the buffer of the audio source.

16. The one or more non-transitory computer-readable media of claim 15, the operations further comprising:

determining that a link condition score for the wireless link between the audio source and the audio output device is below a predetermined threshold for the wireless link; and in response to determining that the link condition score for the wireless link between the audio source and the audio output device is below the predetermined threshold for the wireless link, modifying the wireless link between the audio source and the audio output device.

17. The one or more non-transitory computer-readable media of claim 15, wherein modifying the wireless link between the audio source and the audio output device comprises modifying a Flush Timeout (FT) value for the CIS of the wireless link.

18. The one or more non-transitory computer-readable media of claim 15, wherein modifying the wireless link between the audio source and the audio output device comprises increasing transmission power of a wireless communication interface of the audio source.

19. The one or more non-transitory computer-readable media of claim 15, wherein modifying the wireless link between the audio source and the audio output device comprises transmitting signals using a beamforming technique.

20. The one or more non-transitory computer-readable media of claim 15, wherein the audio output device is a set of true wireless earbuds.

* * * * *